(12) United States Patent
Melcher

(10) Patent No.: US 7,131,650 B2
(45) Date of Patent: Nov. 7, 2006

(54) VEHICLE LEAN AND ALIGNMENT CONTROL SYSTEM

(76) Inventor: Thomas Wesley Melcher, 1239 W. Esplanade, Mesa, AZ (US) 85201

( * ) Notice: Subject to any disclaimer, the term of this patent is extended or adjusted under 35 U.S.C. 154(b) by 2 days.

(21) Appl. No.: 10/695,377

(22) Filed: Oct. 27, 2003

(65) Prior Publication Data

US 2005/0040619 A1 Feb. 24, 2005

Related U.S. Application Data

(63) Continuation-in-part of application No. 10/428,274, filed on May 2, 2003, now Pat. No. 6,805,362.

(51) Int. Cl.
*B60G 7/00* (2006.01)
(52) U.S. Cl. ............... 280/5.52; 280/5.521; 280/5.5
(58) Field of Classification Search ............... 280/5.52, 280/5.521, 5.522, 5.5, 5.504, 5.508, 5.509, 280/5.51, 5.512, 5.517, 5.518
See application file for complete search history.

(56) References Cited

U.S. PATENT DOCUMENTS 4,546,997 A * 10/1985 Smyers .................. 280/5.509
5,324,056 A * 6/1994 Orton .................. 280/124.106
6,805,362 B1 * 10/2004 Melcher .................... 280/5.52

* cited by examiner

*Primary Examiner*—Eric Culbreth
(74) *Attorney, Agent, or Firm*—Schmeiser, Olsen & Watts LLP

(57) ABSTRACT

A frame and suspension for a vehicle provides automatic lean and alignment. The lean is determined by force sensors, the speed and/or the angle of turn and is provided by actuators in the suspension in accordance with a predetermined protocol in an electronic control unit (ECU). The protocol also provides shock absorption by rapidly tracking a contour of a surface on which the vehicle rides. The suspension is provided by a plurality of arm assemblies each including a lower arm, an upper control arm, and an actuator motively connected to the lower arm and to the upper control arm. The arm assemblies are pivotally connected to the frame on a common axis. The arm assemblies generally form parallelograms and are actuated in concert to remain generally parallel to each other through a range of angles to adjust the lean of the vehicle. The arm assemblies are also actuated independently of each other to accommodate variations in the contour. In one aspect, an actuator controlled by an ECU can be replaced by a mechanical actuator that can be activated manually such as by a driver's own leaning weight.

21 Claims, 16 Drawing Sheets

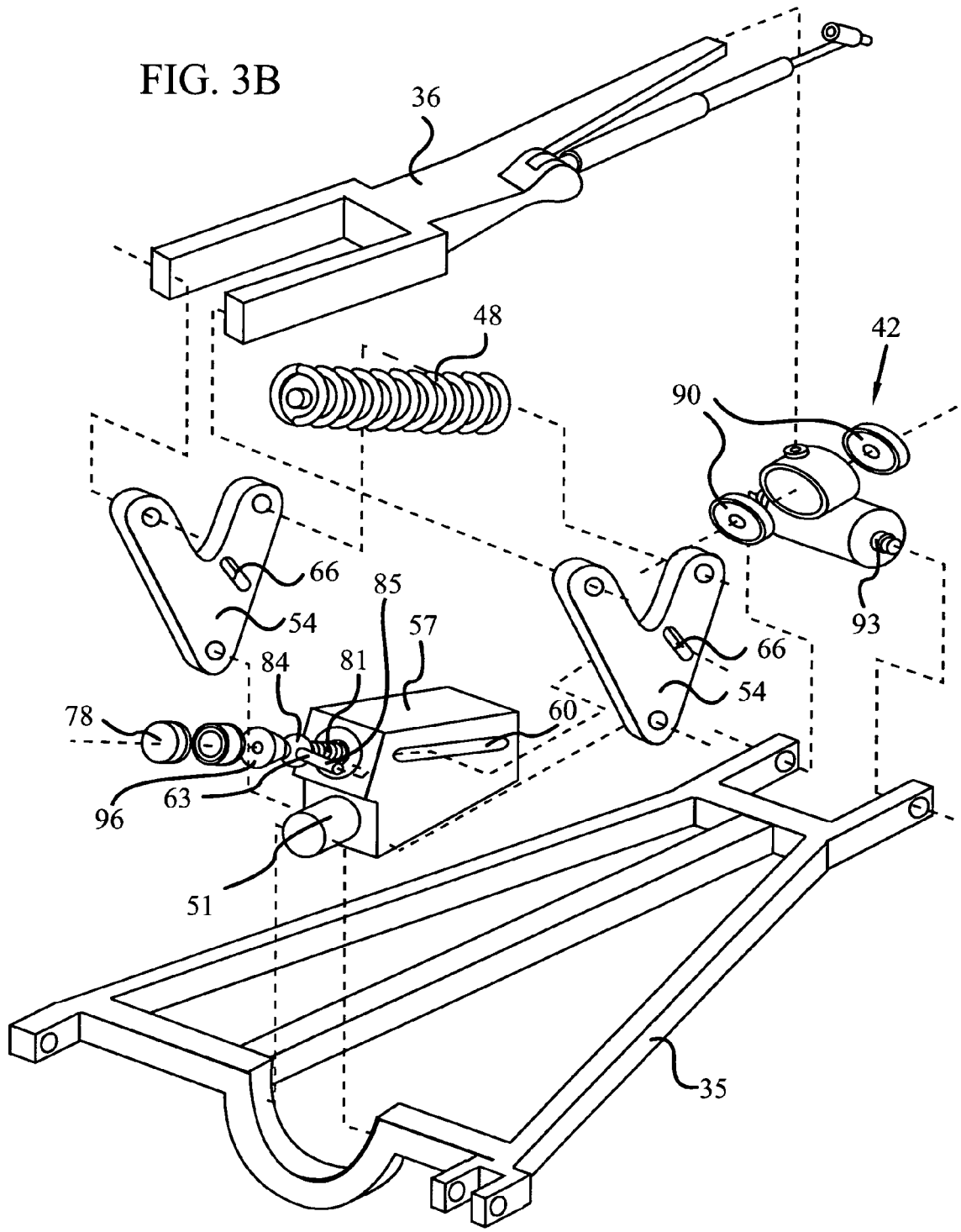

VEHICLE LEAN AND ALIGNMENT CONTROL SYSTEM

This application is a continuation-in-part of U.S. patent application Ser. No. 10/428,274 by Thomas Wesley Melcher, filed May 2, 2003 now U.S. Pat. No. 6,805,362.

BACKGROUND OF THE INVENTION

1. Technical Field

This invention generally relates to vehicles that are capable of being leaned and that have rear steering capabilities, and more specifically to a frame and suspension system that facilitates leaning and rear steering on a vehicle having more than two wheels.

2. Background Art

Vehicles capable of leaning include motorcycles. Of course, standard configuration motorcycles have only two wheels so that leaning the vehicle happens naturally. The benefits of leaning include that leaning facilitates turning. Leaning the motorcycle in a direction while the motorcycle is moving forward actually pulls the front steering in the same direction. Another benefit of leaning the motorcycle is that the wheels are also leaned and better support the forces applied to the wheel and tire. At the same time, leaning increases the contact area of the tire on a driving surface. Still further, leaning the motorcycle better positions the center of gravity on the line of force applied to the surface by the motorcycle and driver.

Rear wheel alignment by a rear steering mechanism has been implemented on vehicles having four wheels, such as automobiles. Rear steering mechanisms have been provided for counter steering the rear wheels for greater maneuverability. These counter steering mechanisms are generally restricted to operation at low speeds.

DISCLOSURE OF THE INVENTION

The present invention relates to a vehicle that includes many of the advantages of a motorcycle on a vehicle having three or more wheels. With the frame and suspensions of the present invention, the same advantages of leaning the wheels and the frame of the vehicle supported on the frame are provided. With each additional wheel over two, an additional adhesion point is provided. Thus, a vehicle with four wheels will have twice as many adhesion points as a standard motorcycle. As such, the vehicle will enable faster stopping. Also, the vehicle can automatically lower the frame and provide a lower center of gravity of the vehicle during deceleration. One way of carrying this out is to automatically cause the rear suspension to mirror the front suspension during braking. Furthermore, it is contemplated that approximately a thirty percent increase in speed around corners may be achieved with the present invention. This is due, in part, to the increased adhesion patch at each of the adhesion points when the wheels are leaned during turning. Still further, with the frame leaning into turns, the centrifugal and gravitational forces are more evenly distributed among the adhesion points. The vehicle can include additional advantages of automatically leaning the frame and wheels and aligning the rear wheels. Aligning the rear wheels reduces drag that typically occurs during turns, and thus improves gas mileage or efficiency in general.

Another advantage provided by the frame and suspension of the present invention is that they include shock absorption by way of shock absorbers and an electro-mechanical tracking mechanism. The term "shock absorbers" as used throughout this disclosure can include a spring coiled over a shock absorption device, a torsion bar, or an air shock for example. In any case, it is to be understood that "shock absorber" as used herein refers to a mechanism having support characteristics capable of supporting the chassis and body weight of a vehicle and having shock absorbing characteristics. The shock absorption of the frame and suspension can be in addition to shock absorbers on a vehicle body, such as on a motorcycle body. That is, the motorcycle body with its front and rear shocks can be supported on the frame and suspension of the present invention. As can be appreciated this offers redundancy and provides an exceedingly smooth ride. The stiffness of the various shock absorbers and tracking mechanism can be varied to absorb a variety of shock and vibrations.

The shock absorbers of the frame and suspension system of the present invention are mounted as close to a central longitudinal axis as possible. This location together with the structural relationship of the shock absorbers to the frame and suspension provides the advantage of increased mechanical advantage for forces applied to the wheels, the frame, vehicle body, and the driver/rider(s) with increased lean.

The change in position of the shock absorber(s) relative to the lower arm helps reduce the transfer of force to the other side of the frame. Furthermore, the present suspension includes an arm assembly for each wheel that it supports. Each arm assembly can be deflected independently so that the load is minimally transferred to the other side of the frame.

The lean can be effectuated automatically with an electronic control unit (ECU). This enables the system to automatically select the amount of lean based on the speed and angle of turn of the vehicle. Alternatively or additionally, the angle of lean can be determined and automatically adjusted based on feedback from one or more force sensors that are positioned to detect a distribution of gravitational and centrifugal forces. Likewise, the angle of turn of the rear wheels can be automatically adjusted by the ECU. Thus cornering can be significantly aided and the protocol in the ECU can be configured and/or adjusted to place these automatic features at their maximum with a selected safety factor. Alternatively, the ECU can be replaced by other processors including mechanical processors. Such mechanical processors could employ a variety of springs including air springs, and could include compressible and non-compressible fluids to coordinate movement between arm assemblies. Further alternatively, the lean could be effected through a set of gears or a force multiplying device such as a fluid piston, rack and pinion mechanism. Still further, part of the system could be automatic and the rest of the system could be manually controlled by the vehicle driver. In this case, the driver replaces the portion of the processor that would otherwise automatically control at least some of the function of the frame and suspension system. For example, the frame and suspension system could be configured to automatically track a contour of the driving surface for improved shock absorption, while requiring the driver to determine the amount of lean by shifting his or her body weight, as with a standard motorcycle. In this case, the frame and suspension could normally hold the vehicle in an upright position when no substantial leaning force is applied, and lean can depend on the sensory perception and control of the driver.

In a simple form in which the invention is implemented without an ECU, a vehicle having a substantially mechanically controlled suspension is provided. As with the above described aspects, the substantially mechanical version provides a vehicle having a suspension with a lean and alignment control system. The system includes a frame having a central longitudinal axis and an upright axis that is generally perpendicular to a surface on which the vehicle rests when the frame is in a neutral position with no net leaning loads applied. The system also has a suspension including a plurality of arm assemblies connected to the frame. The system further has a mechanical feedback mechanism forming an interconnection between the frame and the suspension. Each arm assembly includes a lower arm with an inboard end and an outboard end, an upper control arm having an inboard end and an outboard end, and an actuator mounted to the lower arm and motively connected to the upper control arm.

In the mechanically controlled system, the actuator further includes an actuator arm pivotally connected to the inboard end of the upper control arm. The actuator arm pivotally is connected to the inboard end of the lower arm. A mechanical drive mechanism is motively connected to the actuator arm to move the actuator arm through a range of motion.

In one aspect, the mechanical drive mechanism includes an actuation cylinder in fluid communication with a fluid driven rack and pinion. The fluid driven rack and pinion is drivingly connected to the actuator. In this aspect, the actuation cylinder is fluidly connected to the fluid driven rack and pinion by a high pressure fluid line containing a substantially noncompressible fluid. A fluid reservoir is disposed in the high pressure fluid line for receiving excess fluid during periods of high flow rate. Advantageously, the reservoir is expansible and has a spring for adjusting expansibility. Thus, the fluid system can be adjusted to take up excess fluid under conditions of greater or lesser fluid flow that may be generally proportional to the forces applied by bumps in the contour of the driving surface. Also in this aspect, the present invention includes a pressure control valve in the high pressure fluid line for adjusting a flow aperture through which the fluid flows and for providing a safety pop off valve. In this fluid driven aspect of the invention, the actuation cylinder may be fluidly connected to a first side of the fluid driven rack and pinion by the high pressure fluid line, and the actuation cylinder may also be fluidly connected to a second side of the fluid driven rack and pinion by a low pressure fluid line. It is to be understood that fluid connections on both sides may comprise the noncompressible fluid. Alternatively, one side of the system may have a gas in place of the non-compressible fluid.

As in the other aspects, the mechanically controlled system can include a plurality of like arm assemblies. In this case, the mechanical feedback mechanism is a first mechanical feedback mechanism. The vehicle further has a plurality of similar feedback mechanisms operatively associated with respective arm assemblies.

In one aspect, the mechanical feedback mechanisms comprise respective position indicating cams operably associated with the respective arm assemblies for automatically controlling the mechanical drive mechanism and the actuator arm in each arm assembly. With regard to this aspect, the plurality of arm assemblies includes at least a first arm assembly on a first side of the frame and a second arm assembly on a second side opposite to the first side. The mechanical feedback mechanisms automatically move the first arm assembly through a first lean angle closer to the frame and the second arm assembly away from the frame so that the first and second arm assemblies remain generally parallel to each other in response to a leaning force applied by a rider of the vehicle.

In an exemplary basic form, a vehicle with a lean and alignment control system in accordance with the present invention includes a frame having a central longitudinal axis. The frame also has an upright axis that is adapted to be generally perpendicular to a surface on which the vehicle rests when the frame is in a neutral position with no net leaning loads applied. A vehicle body is supported on the frame. A suspension comprising a plurality of arm assemblies is connected to the frame. Each arm assembly includes a lower arm having an inboard end and an outboard end, an upper control arm having an inboard end and an outboard end, and an actuator mounted to the lower arm and motively connected to the upper control arm. Many variations are possible without departing from the spirit and scope of the invention. Some of these variations will become apparent in the detailed description below. It is to be understood that while many aspects of the invention are described herein with regard to a vehicle, the invention also encompasses the frame and suspension system by itself. Likewise, the invention encompasses the suspension system and the individual arm assemblies that make up the suspension.

The present invention in one aspect includes a method of properly leaning and aligning a vehicle supported on a suspension. This method has several basic steps including automatically leaning a frame of the vehicle at a predetermined angle relative to an arm of one of a plurality of arms assemblies. Automatically leaning the frame can further include providing a protocol in a processor to control the lean. Data is then automatically fed from a vehicle speed sensor and a steering position sensor to the processor. The frame is automatically moved relative to the arm according to the protocol under processor control.

In another aspect, the present invention includes a method of tracking a contour of a driving surface to absorb shock. The method includes automatically and independently raising and lowering a plurality of arms of a vehicle suspension to accommodate variations in the contour. In order to do this, the system provides feed forward by a mechanical shock absorber. The system may provide additional feed forward by taking up excess fluid in an expansible reservoir in fluid communication with the mechanical mechanism. Then the step of raising and lowering the plurality of arms is accomplished by providing feedback to a processor; which raises and lowers the arms under processor control.

The automatic and tracking aspects of the method described above are particularly applicable to the method implemented with and controlled by an ECU. However, many of the same steps are also provided in the method as it applies to the mechanically controlled and aligned system. For example in one aspect, a method of tracking a contour of a driving surface to absorb shock includes automatically and independently raising and lowering a plurality of arms of the vehicle suspension to accommodate variations in the contour by a mechanical mechanism. Like the aspects described above, this method includes providing feed forward by at least one mechanical shock absorber. Like the system described above, this system may provide additional feed forward by taking up excess fluid in an expansible reservoir in fluid communication with the mechanical mechanism. Another step is providing feedback via the mechanical mechanism to an actuator. The method also includes raising and lowering the arms by the actuator according to the feedback.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 3B is an exploded perspective view of the arm assembly of FIG. 3A;

DETAILED DESCRIPTION OF EMBODIMENTS OF THE INVENTION

As discussed above, embodiments of the present invention relate to a vehicle, and a frame and a suspension system for the vehicle.

Figure 1A:
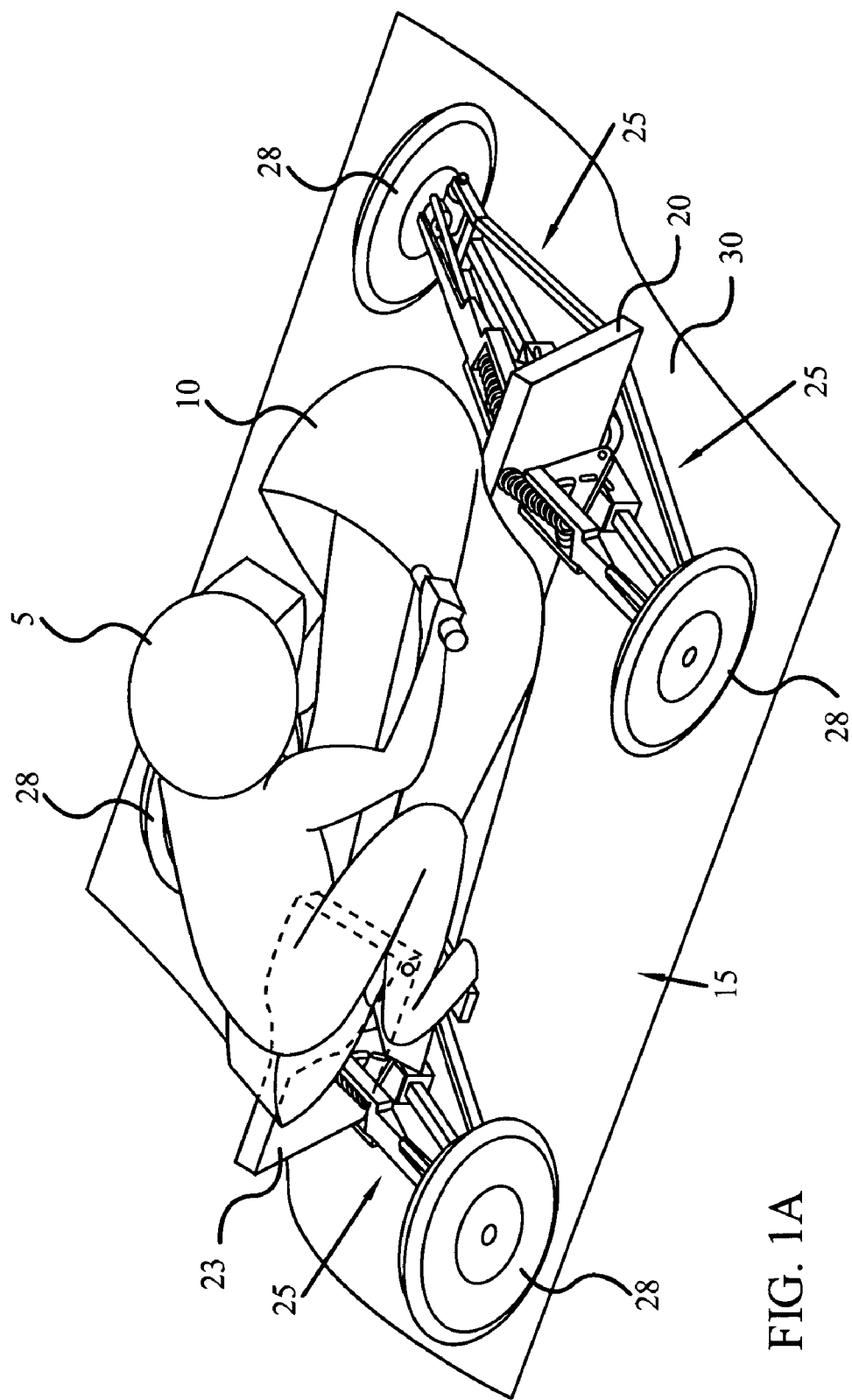
FIG. 1A is a perspective view of a vehicle incorporating frames and suspensions according to an embodiment of the present invention.

As shown in FIG. 1A, a driver 5 is seated on a vehicle 10 that is supported on a frame and suspension system 15 in accordance with the present invention. In the example of FIG. 1A, the frame and suspension system includes a front frame 20 and a swing arm frame 23. Each of frames 20 and 23 has separate suspensions in the form of arm assemblies 25. Each arm assembly 25 is independently and pivotally connected to the frames 20, 23. The arm assemblies 25 support wheels 28 at outboard ends. The wheels 28, of course, support the frame and suspension system 15 and the vehicle 10 on a driving surface 30.

Figure 1B:
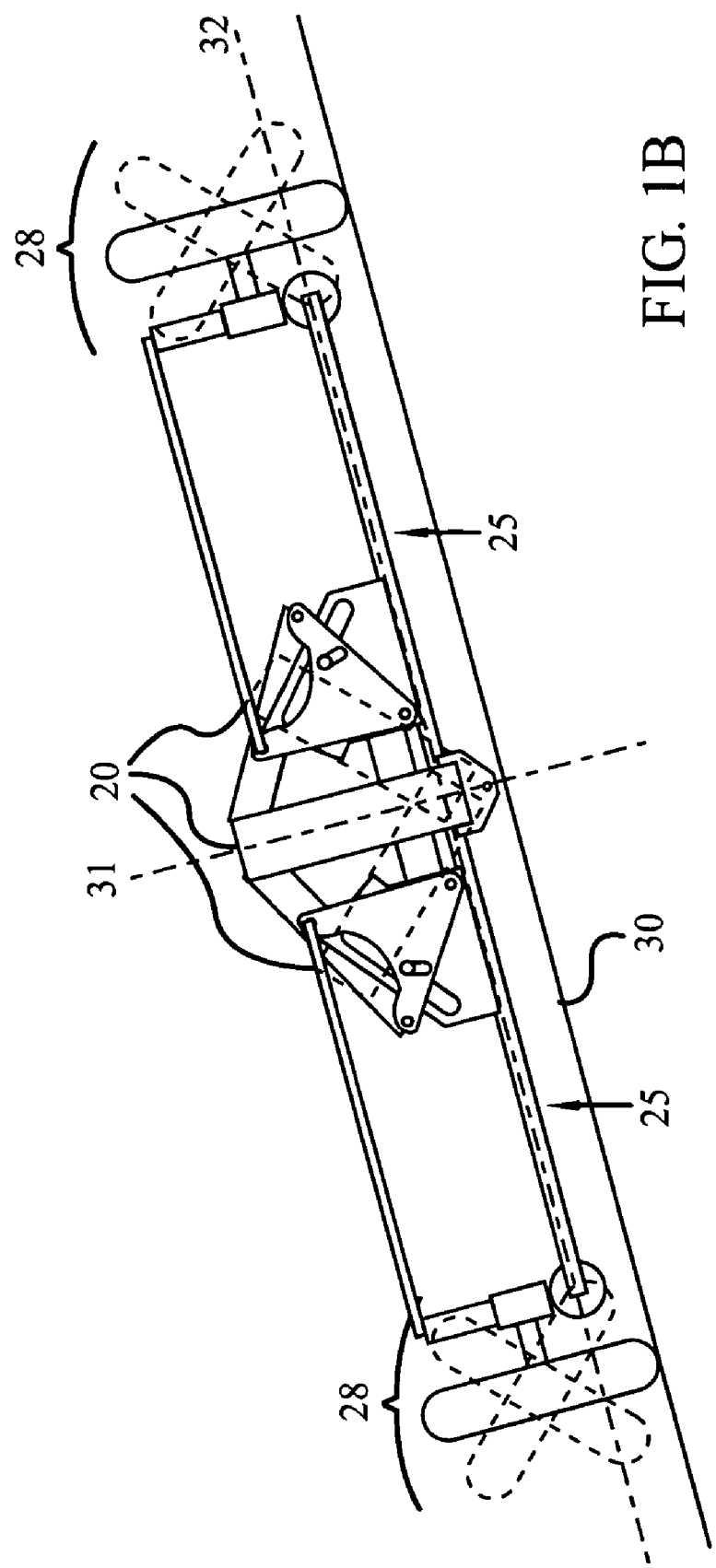
FIG. 1B is a diagrammatic end view of the frame and suspension of FIG. 1A showing a variety of lean positions of the frame and wheels.

As can be appreciated from the diagrammatic end view of FIG. 1B, the arm assemblies 25 permit the frames 20, 23 to lean through a range of angles relative to a plane 31 that is upright and substantially perpendicular to a plane 32 defined by the arm assemblies in a neutral position with no net leaning forces thereon. The arm assemblies 25 have structural details to be further described below that generally form parallelograms and thereby lean the wheels 28 generally at the same angle to the arm assembly plane 32 as the frame 20, 23 is to the arm assembly plane 32. This is the case, at least, when the surface 30 is reasonably smooth so as not to raise or lower any of the arm assemblies out of the plane 32. Thus, it can be seen that in cornering applications, the wheels 28 and the frames 20, 23 will be substantially parallel to each other. The frames 20, 23 will generally shift a center of gravity to better balance the centrifugal forces. Both the wheels 28 and the frames 20, 23 will be oriented to provide a stronger support for the centrifugal and gravitational forces that will be applied.

Figure 2A:
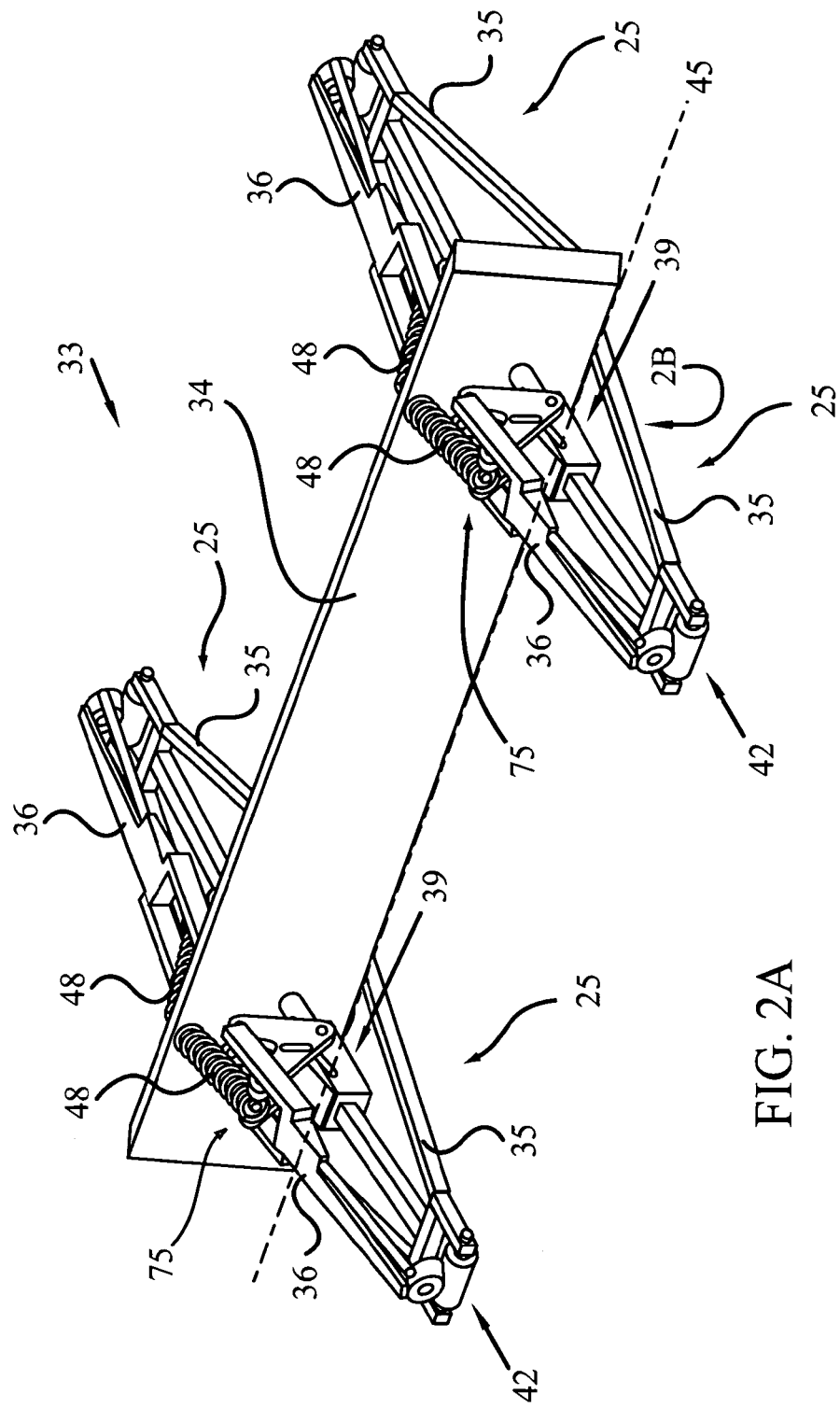
FIG. 2A is a perspective view of a frame and suspension showing the frame in a leaned position.

FIG. 2A is a perspective view of a frame and suspension system 33 with a frame 34 similar to frame 20, but having a length sufficient to support a whole vehicle. This particular configuration lends itself to supporting a bicycle, such as a recumbent bicycle. However, combination with any vehicle, motorized or not, whether existing or not yet designed, is within the spirit and scope of the invention. Likewise, frames of any configuration can be substituted for the frames 20, 23, and 34 as long as the substituted frames provide similar mountings to the exemplary embodiments described herein. FIG. 2A shows the frame 34 leaned to one side. That is, the frame 34 is leaned toward at least one arm assembly 25 and away from the other arm assembly 25 on an opposite side of the frame 34.

In the position shown in FIG. 2A, a parallelogram effect becomes apparent. That is, each arm assembly 25 has a lower arm 35, an upper control arm 36, an actuator 39 connecting inboard ends of the lower arm 35 and the upper control arm 36, and a hub assembly 42 connecting the outboard ends of the lower arm 35 and the upper control arm 36. Each of the lower arm 35, upper control arm 36, actuator 39, and hub assembly 42 are pivotally connected to each other. All of the arm assemblies 25 are pivotally connected to the frame 34 on a common pivot axis 45. In this way a height mismatch in points of connection is avoided when the frame 34 is leaned. However, it is possible to mount the arm assemblies on laterally outward edges of a wider frame without departing from the scope of the invention. The arm assemblies are also connected to the frame 34 by shock absorbers 48. The shock absorbers permit damped movement as will be described in further detail below.

Figure 2B:
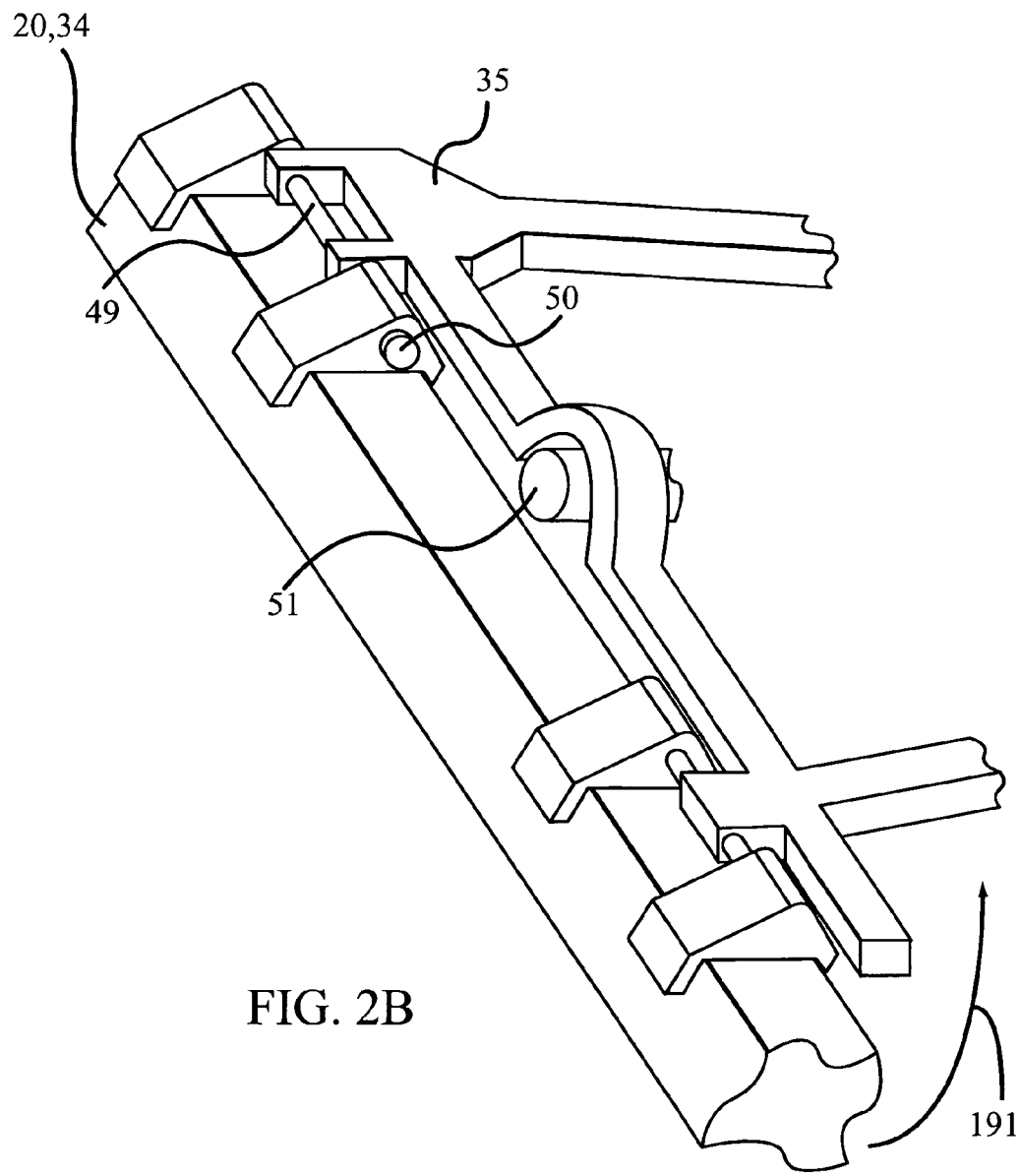
FIG. 2B is a perspective view of a portion of an underside of the frame and suspension in a region indicated by arrow 2B in FIG. 2A.

FIG. 2B is a perspective view of an underside of the frame 20 in a region indicated by arrow 2B in FIG. 2A. FIG. 2B shows a connection of the lower arm 35 by way of a lower arm pin 49 that is press fit or otherwise fixed to the lower arm 35. The lower arm pin 49 rotatably moves in a bore in the frame 20. An inboard position sensor 50 is fixed to the frame 20 in alignment with the pin 49 to sense a rotational position of the lower arm relative to the frame 20. The position sensor 50 can be provided as a potentiometer similar to those to be described below with regard to outboard position sensors.

Figure 3A:
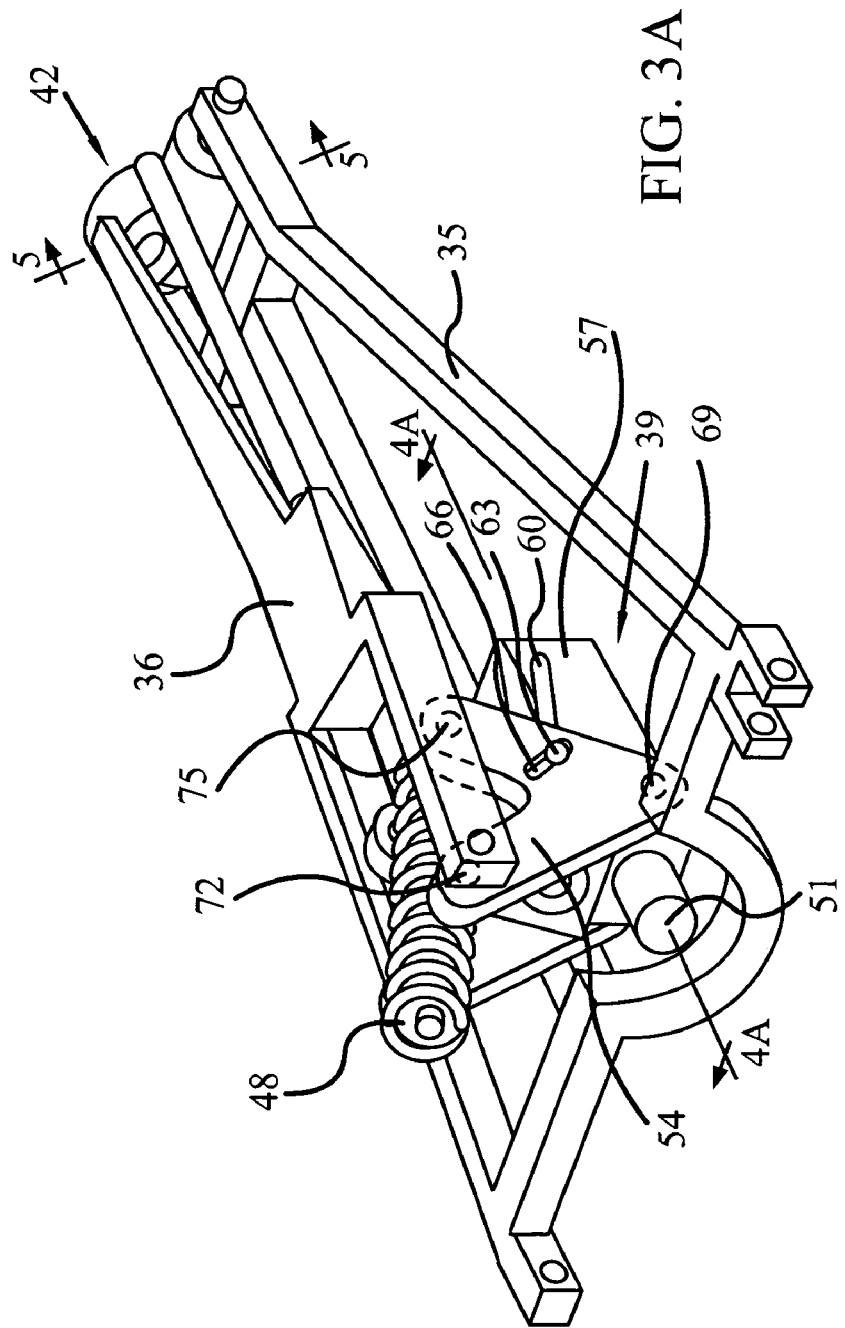
FIG. 3A is a perspective view of an arm assembly of the suspension according to the embodiments of FIGS. 1A–2B above.

FIG. 3A shows one of the arm assemblies 25 in a perspective view. The actuator includes a motor 51 mounted to the lower arm 35. The motor 51 is motively connected to an actuator arm 54 through an actuator housing 57. The actuator arm 54 is pivotally mounted on the housing 57 at a first connection 69. The actuator housing 57 has a drive slot 60 in which a cam pin 63 is caused to move by the motor 51.

The cam pin 63 also extends into a cam slot 66 in the actuator arm 54. As can be appreciated, moving the cam pin 63 along a length of the drive slot also forces or cams the actuation arm to move through a predetermined range of motion. Movement of the actuation arm causes the upper control arm 36 that is pivotally connected to the actuation arm at a second connection 72 to move. The portion of the actuator arm 54 between the first connection and the second connection generally provides one side of a parallelogram formed by the arm assembly 25. A generally parallel opposite side is provided by the hub assembly 42. It is to be noted that the actuator arm can be one of a pair of actuator arms 54 that straddle the actuator housing for added strength and durability.

The shock absorber 48 is connected to the actuator arm 54 at a third connection 75 that is disposed at an angle from the second connection relative to the first connection 69. The angle is defined as the angle between respective lines through the first and second connections and through the first and third connections. This angle can be in the range from zero to ninety degrees. Specifically, this angle is normally selected to be approximately forty-five degrees. The third connection 75 is located outboard of the second connection 72. That is, when the arm assembly is on a vehicle, the third connection 75 will be located farther from the frame than the second connection. Referring back to FIG. 2A it can be seen that the third connection 75 is located above the upper control arm 36 at one end of the range of motion. The third connection 75 is below the upper control arm 36 at the other end of the range of motion. Thus, the shock absorber 48 has an end to end position that is generally horizontal or parallel to a respective upper control arm 36 at one end of the range of motion. The shock absorber reaches a position that is at approximately forty-five degrees relative to planes defined by the upper control arm 36 and the lower arm 35 at the other end of the range of motion.

As can be appreciated, the present invention is configured to substantially balance centripetal forces, gravitational forces, and shock forces between arm assemblies on opposite sides of the frame.

The overall relationship between the shock absorbers 48, upper control arms 36, lower arms 35, and the actuator arms 54 is such that a mechanical advantage is maintained generally the same throughout the range of motion of the arm assemblies 25. For example, this is due in part to the connection 75 of the shock absorber 48 to the actuator arm 54 rising from a position nearly on the same plane as the lower arm 35 to a position above the upper control arm 36. This added height to the shock absorber connection provides a lever arm for horizontal forces applied through the upper control arm 36. On the other hand, the reorientation of the shock absorber on the other side of the frame to a generally forty-five degree angle better positions the shock absorber 48 to receive the additive forces that are typical for lean in that direction. In other words, the system is constantly reorienting the shock absorbers, upper control arms, actuator arms and frame to enable the shock absorbers to efficiently handle the forces applied to the arm assemblies 25. Hence, the system maintains a balance and a mechanical advantage for the shock absorbers to effectively receive the forces applied to the suspension system throughout the range of motion of each of the arm assemblies 25.

It follows that by the placement of the actuator arms 54 relative to the frame 20, 23, 34, upper control arms 36, lower arms 35, and relative to the shock absorbers 48, a mechanical advantage is achieved and maintained for both sides of the vehicle 10. Furthermore, the shock absorbers 48 are better able to handle forces as the lean of the frame 20, 23, 34 and vehicle 10 increases. This is important because the remaining range of motion of the arm assemblies 25 in their leaned positions is limited and additional shock may need to be absorbed by the shock absorbers 48. On the other hand, much of the shock can be absorbed by a tracking function effectuated by moving the arm assemblies 25 by the actuators 39 as will be described in greater detail below.

It is to be understood that the upper control arms 36 and the lower arms 35 may be interchanged and still provide the same advantages described above. That is, while the actuator housing 57 and the motor 51 are shown and described above as being fixed to the lower arm 35, they could just as easily be mounted on the upper control arm 36. In this configuration, the actuator arms 54 would motively actuate the lower "control" arms 35 while the generally parallelogram configuration would be maintained similar to the embodiments described above. Alternatively described, the entire frame and arm assemblies could be turned over so that the shock absorbers are generally down and the actuators are generally up. Some additional modifications may be required to make such a frame and suspension function properly. However, it appears that many if not all of the advantages described above could be achieved by this reversal of parts, and doing so is considered to be within the spirit and scope of the invention.

FIG. 3B is an exploded perspective view of the arm assembly 25 showing additional details. For example, the actuator housing 57 has a lead screw cover 78 enclosing the lead screw 81 and its associated components. A ball nut 84 is received on the lead screw 81 and moves along a length of the lead screw 81 as the motor 51 is run. The cam pin 63 is provided by oppositely extending shafts 85 that are rigidly connected to the ball nut 84 and extend outwardly from the ball nut 84 in order to engage in the drive slot 60 and the cam slot 66. Typically the ball nut 84 and the cam pin 63 are one integral piece.

The hub assembly includes a pair of hub bearings 90 for rotatably supporting an axle in known configurations. The axle may include a plurality of universal or constant velocity joints. The hub assembly 42 also includes a hub pin 93 that is to be press fit or otherwise fixed to a lower end of the hub assembly 42. The hub pin 93 is rotationally supported on an outboard end of the lower arm 35 as will be described in greater detail below.

Figure 4A:
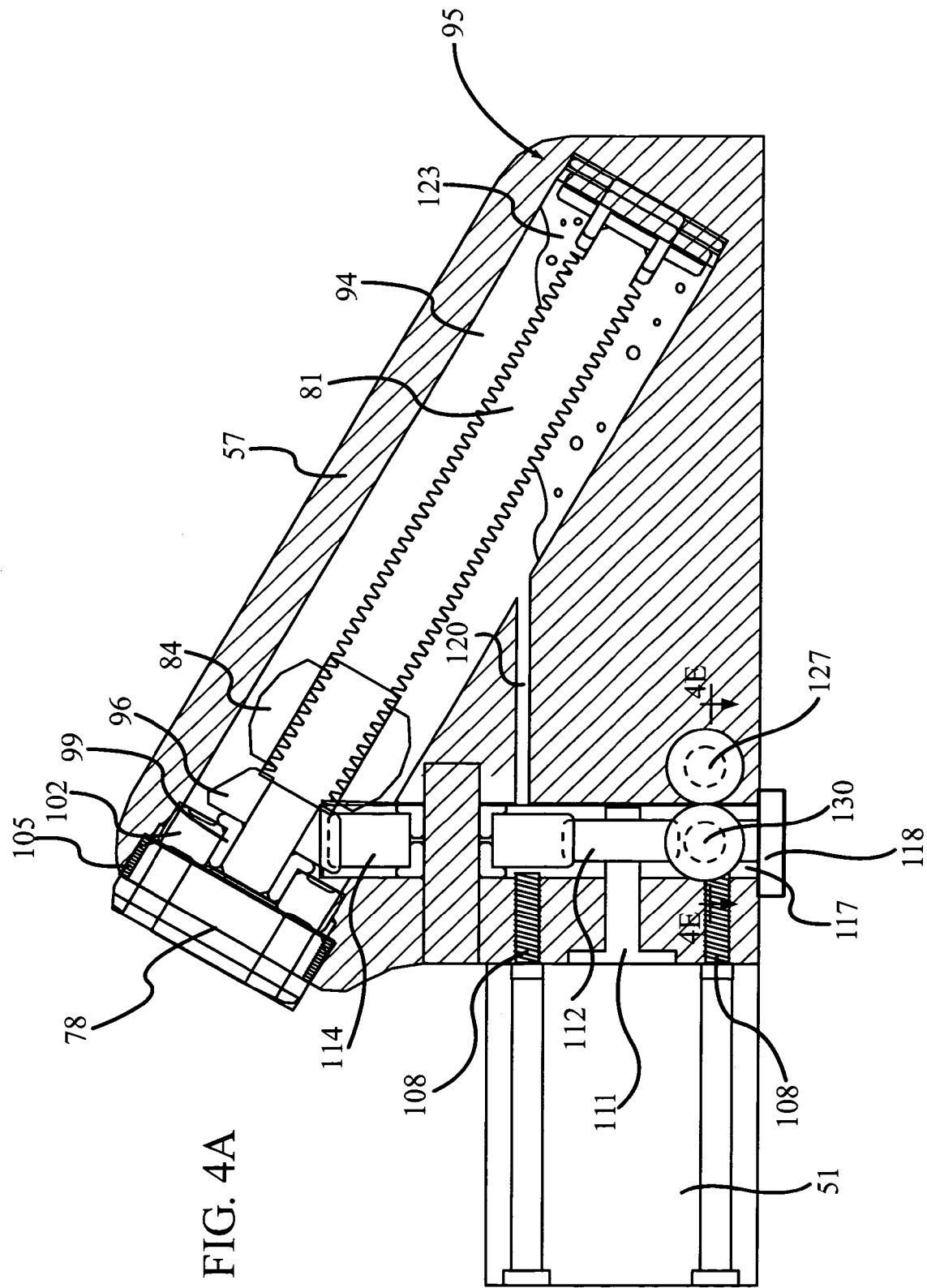
FIG. 4A is a side sectional view of the actuator housing taken along lines 4A—4A of FIG. 3A.

FIG. 4A is a sectional view of the actuator housing 57 taken along lines 4A—4A of FIG. 3A. The lead screw 81 and ball nut 84 are received in a lead screw opening 94. The lead screw opening 94 can be provided by boring the housing 57. A thrust bearing 95 is disposed at a lower end of the opening 94 for receiving a lower end of the lead screw 81. The lead screw 81 has a lead screw gear 96 for receiving a driving force, a bushing 99, and a thrust bearing 102 supported thereon. The lead screw 81 and its associated components are enclosed by the lead screw cover 78. This can be accomplished by providing a threaded connection 105 between the cover 78 and the housing 57. A seal may also be provided between the cover 78 and the housing 57.

The motor 51 is mounted on the housing 57 such as by screws as indicated at 108. Mounted thus, a motor drive shaft 111 extends into the housing 57. A drive gear 112 drives an idler gear 114, which drives the lead screw gear 96. The drive gear 112 and the idler gear 114 are received into a gear train opening 117. The gear train opening 117 is closed by a gear train cover 118 which can be attached to the housing 57 by screws or the like. A seal may be placed between the gear train cover 118 and the housing 57. Furthermore, a seal in the form of telescoping plates or a resilient material may be provided to close the slot 60 shown in FIGS. 3A and 3B. Such a seal is designed to accommodate the movement of the cam pin 63 in the drive slot 60, (shown in FIGS. 3A and 3B), while substantially sealing an interior of the housing 57. With further reference to FIG. 4A, at least one through bore 120 may be formed as an extension from a screw hole for screws at 108 into the lead screw opening 94. The through bore 120 thus provides a flow path for an oil bath 123 that circulates about and cools the lead screw 81 and its components. It is to be understood that the motor and lead screw may be rotated exceedingly fast. Hence, the oil bath 123 is usually needed to prevent overheating and failure of the components. It is to be further understood that the lead screw can be replaced by a worm gear that would provided even faster actuation or permit fast actuation at lower revolutions per minute of the motor. However, the surface area of engagement between the worm gear and splines that the worm gear motively engages is very small. Hence, the strength of the actuator will be greatly reduced. Further alternatively, the motor could have an integral lead screw and could be mounted substantially in the location of the lead screw cover 78.

Still further alternatively, the actuator motor 51 could be disposed at ninety degrees relative to the position shown in FIGS. 2A, 2B, 3A, 3B, and 4A and can be provided with a worm gear output for driving drive gear 112. Mounting the actuator motor 51 in this manner has the advantage of isolating the lead screw 81 and thus inhibiting back driving of the actuator motor 51 by forces on the suspension arms.

The actuator includes the motor 51, the actuator housing 57 with its contents, and at least part of the actuator arms 54. Alternatively, the actuator 39 could be replaced by a linear actuator that is pivotally mounted to the lower arm 35 or the upper control arm 36 and pivotally mounted to the actuator arm. However, it is to be understood that the actuator mechanism inhibits back driving of the mechanism by forces applied through the shock absorber 48.

Figure 4B:
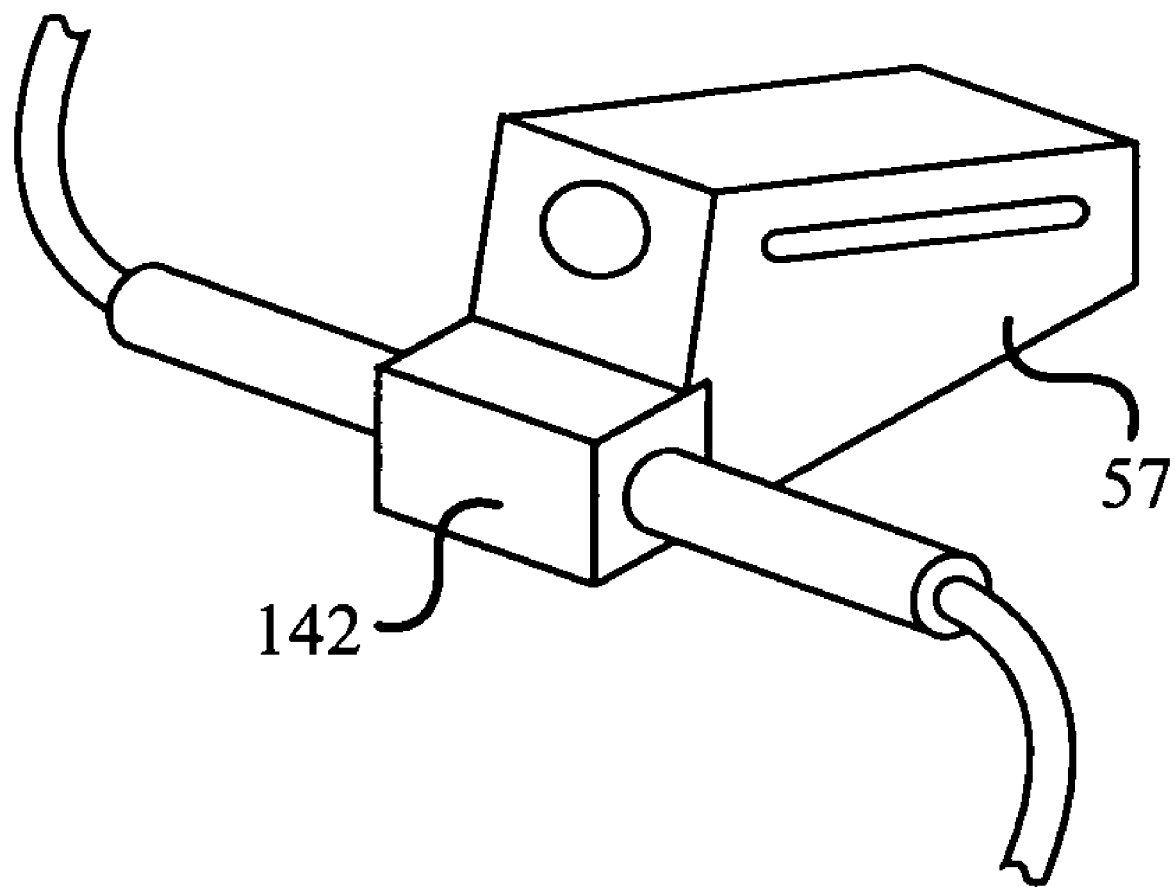
FIG. 4B is a perspective view depicting an alternative actuator drive.
Figure 4D:
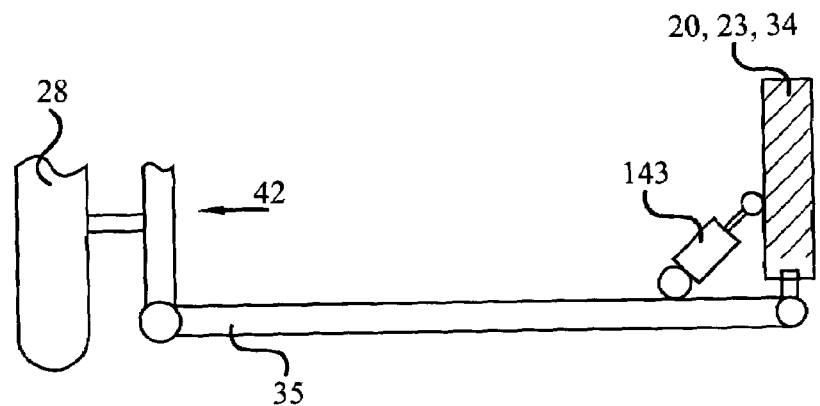
FIG. 4D is a partial end view showing the connection of the fluid transfer device of FIG. 4C to a frame and a suspension of the present invention.
Figure 4E:
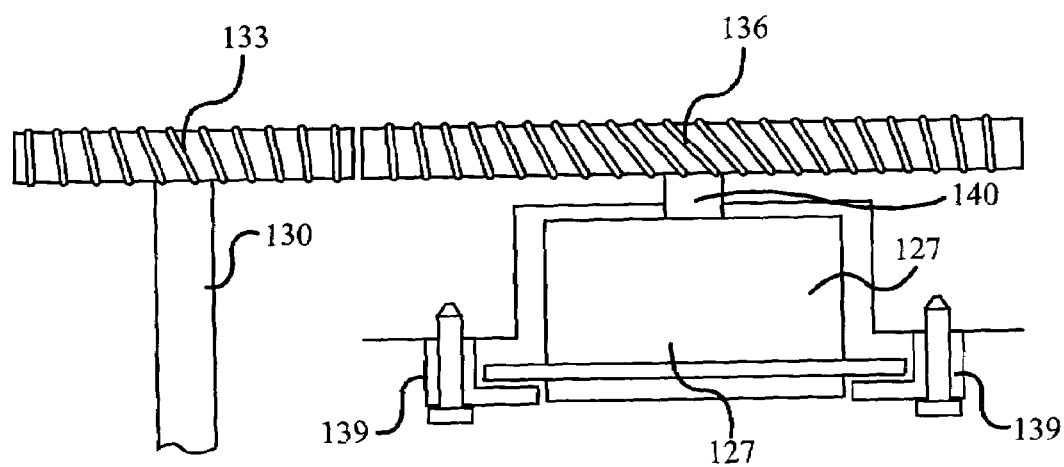
FIG. 4E is a sectional view of an outboard position sensor taken along lines 4E—4E of FIG. 4A.
Figure 4C:
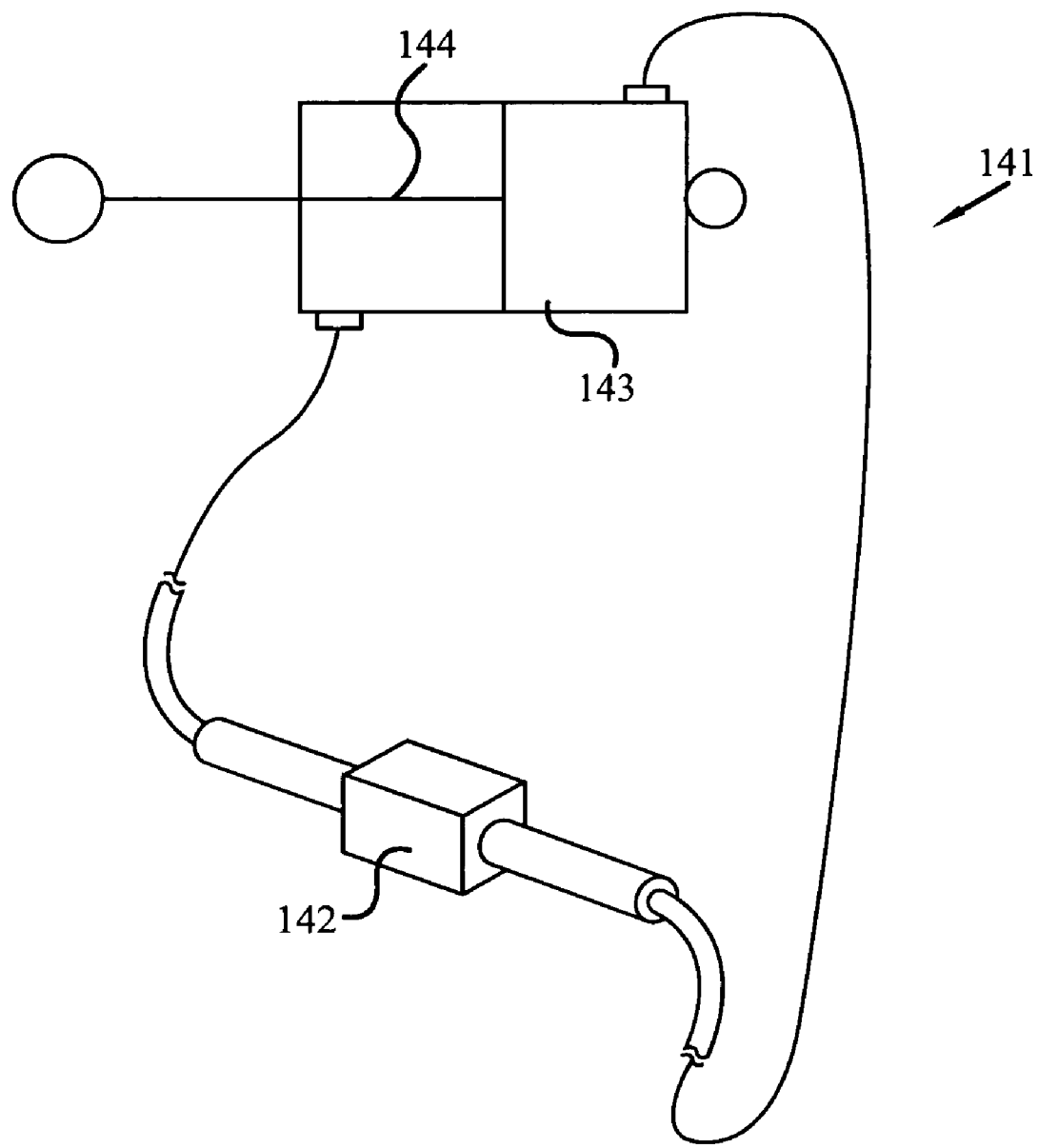
FIG. 4C is a partial schematic view of the actuator drive of FIG. 4B showing a connection to a fluid transfer device.

FIGS. 4B–4D show an alternative actuator drive mechanism 141 that can be substituted for motor 51. The drive can include a drive in the form of a fluid driven rack and pinion 142 mounted to the actuator housing 57 by conventional means in lieu of the electrical motor 51. The rack and pinion is actuated by a transfer of fluid from an actuation cylinder 143. The actuation cylinder has a piston 144 that is forced from one end to the other end of the actuation cylinder 143 when the frame 20, 23, 34 is leaned relative to the lower arm 35. Movement of the piston 144 simultaneously transfers fluid through lines from one side of the rack and pinion 142 and to the other side of the rack and pinion 142. This plurality of lines is not necessary, but provides the advantage of redundancy. Thus, the rack and pinion is actuated and in turn drives the gears within the housing 57. This mechanical actuator drive 141 enables a user to manually actuate the lean of the vehicle by shifting his or her weight to lean the frame 20, 23, 34 towards the lower arm 35. As can be appreciated, a similar actuator drive mechanism 141 can be incorporated into each of the actuators and the actuation cylinder 143 can be placed at respective positions between the frame 20, 23, 34 and the actuator housings 57. A similar result could be achieved by alternative mechanical devices that include a set of gears, for example. The set of gears in this case would be set in motion by the user shifting his or her weight. Such a mechanical device could drive the gears in the housing 57 instead of the electrical motor 51 or the drive mechanism 141.

Figure 4F:
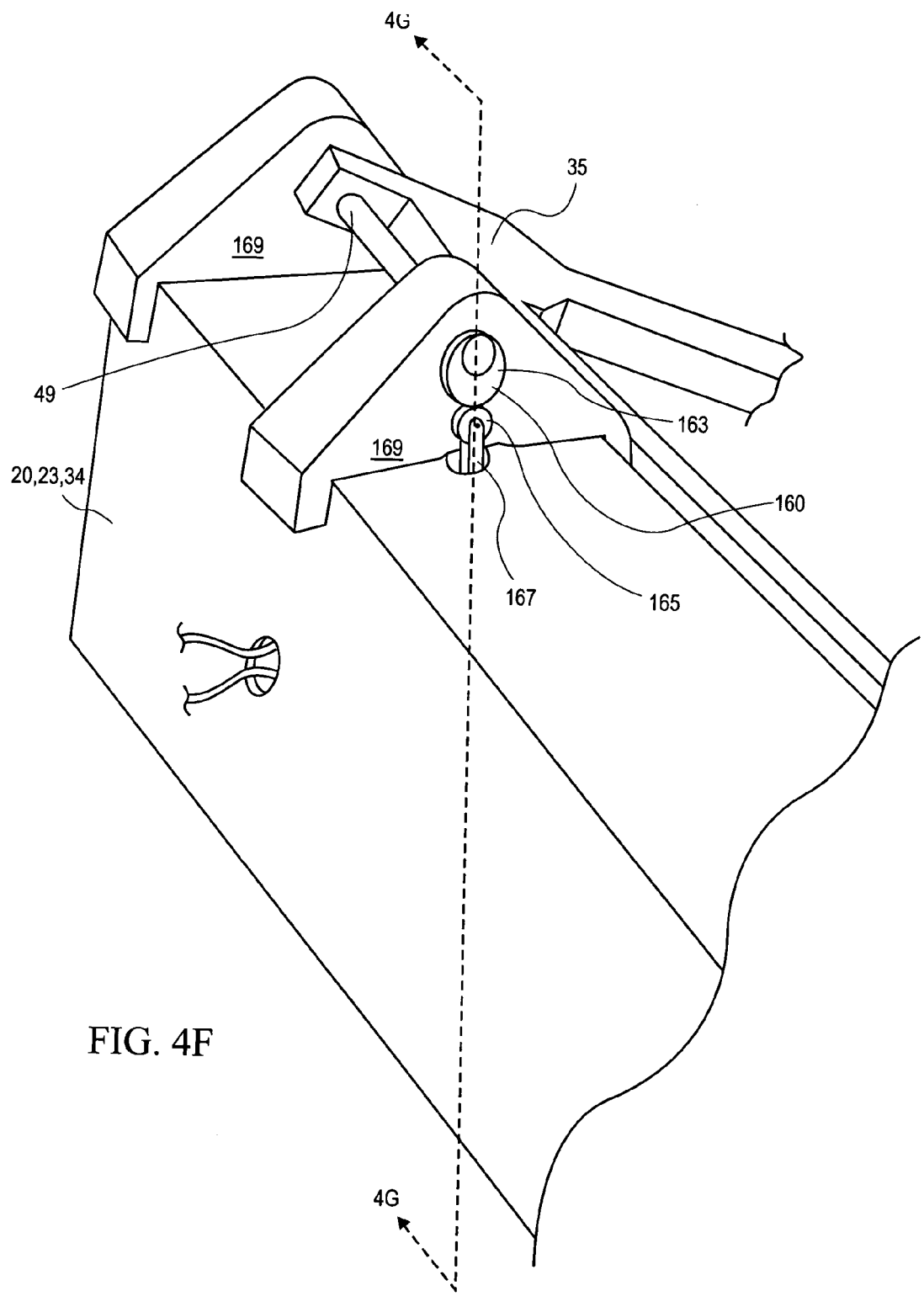
FIG. 4F is a perspective view similar to FIG. 2B and showing an alternative arrangement for the fluid transfer device.

FIG. 4F is a perspective view of an underside of the frame 20, 23, 34 similar to FIG. 2B, but showing an alternative embodiment for the sensing and actuation systems. In particular, the position sensor 50 that is useful with the motor driven embodiment can be replaced by a mechanical sensing device in the form of position indicator cam 160 fixed on the pin 49. Since the pin is fixed relative to the lower arm 35, the position indicating cam represents the position of the lower arm 35 relative to the frame 20, 23, 34. A lobe 163 of the cam 160 engages a roller 165 or other contact end of an actuation cylinder shaft 167 so that as the lower arm 35 is rotated relative to the frame 20, 23, 34, the actuation cylinder drive shaft 167 is moved accordingly. It is to be understood that the pin 49 may be splined or otherwise keyed and the bore of the lower arm 35 into which the pin 35 fits may have mating structure to prevent rotational movement between the pin 49 and the lower arm 35. It is further to be understood that the cam shown in FIG. 4F can be replaced by any appropriate eccentric including a circular eccentric. The embodiment of FIG. 4F can be used in place of the embodiment showing the actuation cylinder 143 between the frame 20, 23, 34 and one of the arms 35 shown in FIG. 4D.

FIG. 4F only shows one lower arm supported on extended brackets 169. As can be appreciated from FIGS. 2B–3B, right and left lower arms 35 interleaf with each other between the brackets 169. Two sets of brackets support a pair of right and left lower arms as can be appreciated from FIG. 2B. Thus, in order to provide feedback from both right and left lower arms 35 of a pair, a position indicator cam 160 for one arm can be supported on a first pair of brackets as shown in FIG. 4F and another position indicator cam 160 fixedly connected to the other lower arm 35 can be supported on a the second pair of brackets. In this way, position indication cam operation can be provided for each of the lower arms independently. Other positions for the position indicator cam 160 and the actuation cylinder drive shaft 167 can be implemented without departing from the spirit and scope of the invention.

Figure 4G:
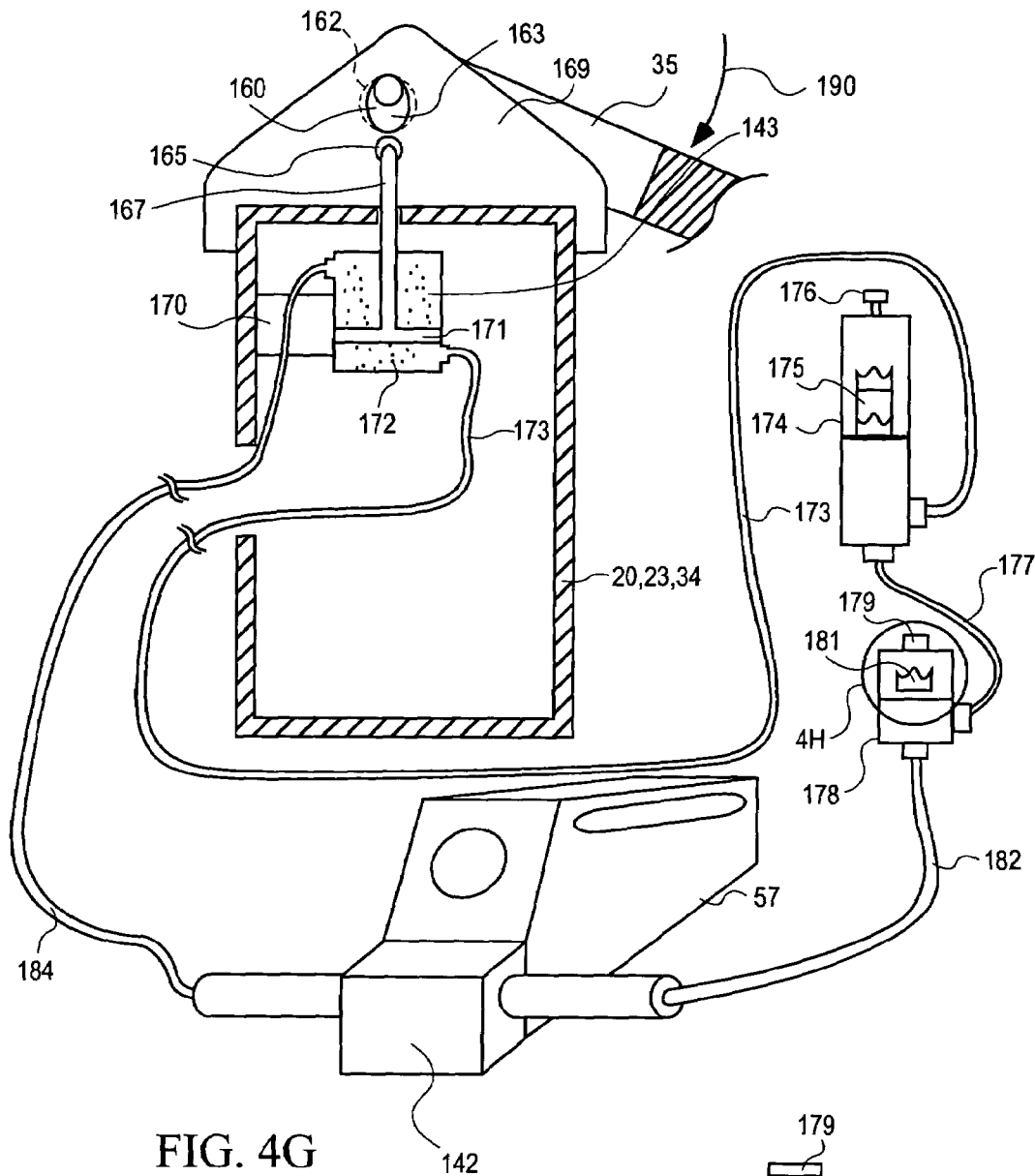
FIG. 4G is a sectional view taken along lines 4G—4G of FIG. 4F.

FIG. 4G is a sectional view taken along lines 4G—4G of FIG. 4F showing the actuation cylinder 143 positioned inside the frame 20, 23, 34. The actuation cylinder can be mounted by a bracket 170 in a position that enables the lobe 163 to properly transmit a representation of a position of the lower arm 35 operably connected to the position indicator cam 160. Thus, as the lower arm is moved closer to the frame as shown in FIGS. 4F and 4G, the position indicator cam 160 exerts a force on the shaft 167 of the actuation cylinder 143. The shaft 167 in turn causes a plunger 171 to force a fluid 172 out of one end of the cylinder 143 and into a first fluid line 173. At the same time, fluid 172 is drawn into the other end or the actuation cylinder 143 as can be appreciated from FIG. 4G. The fluid 172 that is forced out of the actuation cylinder 143 moves through a first fluid line 173. The fluid 172 is substantially non-compressible so that the fluid 172 is also forced from the first fluid line into a fluid reservoir 174. A first portion of the fluid reservoir 174 includes an adjustable spring 175 for absorbing shocks in the fluid system. The spring 175 can comprise a mechanical spring, a gas spring, or a combination mechanical and gas spring. The gas spring aspect of spring 175 may be provided as an air spring. The mechanical and/or gas spring can be pressurized to adjust spring stiffness. The first portion of the reservoir 174 may be separated from a second fluid containing portion of the reservoir 174 by a slidable partition so that the second portion is expansible to hold greater or smaller amounts of the noncompressible fluid. An adjustment knob 176 can be provided by a head of a threaded shaft that enables threaded adjustment of the spring 175 to a greater or lesser spring stiffness.

In this way, if the lower arm 35 experiences a strong deflection by a bump and transfers a load to the actuation cylinder 143 via the position indicator cam 160, then a proportionally strong load will be transferred through the fluid to the fluid driven rack and pinion 142. To avoid too great of shock loads, the spring 175 can be adjusted so that fluid 172 entering the reservoir 174 causes temporary contraction of the spring 175 while the second portion of the reservoir expands. This spring adjustability in combination with a pressure control valve 178 provides a safety mechanism that prevents a pressure from becoming too great. Thus, the pressure control valve inhibits blow out of the lines and keeps other components from breaking under pressure in the fluid system or from forces exerted thereby. This safety feature thus safeguards against exposing gearing in the rack and pinion 142 and within the actuator housing 57 to forces that may cause failure in the gearing or other components.

Figure 4H:
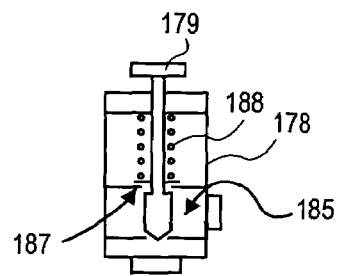
FIG. 4H is a schematic sectional view of a region 4H of FIG. 4G.

A portion of the fluid 172 is forced from the reservoir 174 into a second fluid line 177 either immediately or as the spring 175 relaxes. In turn, the fluid 172 is forced into the pressure control valve 178. The pressure control valve comprises a combination flow rate control mechanism and a pop off valve 181 as indicated in FIG. 4G. FIG. 4H shows the separate components of the combination mechanism 181. The flow rate, and thus the pressure, in the fluid system due to forced flow is controlled by a needle or other valve 185 that controls the opening size through which the fluid 172 passes. When pressures reach a predetermined threshold, a pop off valve 187 permits the fluid 172 to escape in a controlled or metered fashion. This can be provided by a spring 188 provided at a preselected compression. Thus, the pop off valve 187 is an additional safety mechanism that protects the fluid system, gearing and other vulnerable components when the system experiences large shock loads.

In use, restriction by the needle valve 185 causes greater back up of fluid 172 in the fluid reservoir 174 with an increased flow rate if the loads on the suspension are sufficiently high. Increased restriction by the needle valve 185 under these conditions results in lower flow rates in a third fluid line 182 connecting the pressure control valve 178 to the fluid driven rack and pinion 142. Thus, the increased restriction results in less movement in the actuator and more shock absorption by the spring 175 in the fluid reservoir 174. The flow rate of fluid into the reservoir is a function of suspension movement relative to the frame 20, 23, 34. The suspension movement in turn is a function of how fast the vehicle is traveling, how big is an encountered bump, and how the rider's weight is distributed and transferred. Therefore, the fluid reservoir 174 and the pressure control valve 178 are incorporated so that quick high force suspension movements are converted into less mechanism movement in the respective actuators and so that greater shock absorption in the spring 175 in the reservoir occurs for quick, high force shocks to the system.

Adjusting an air pressure or a spring rate of the spring 175 controls how much fluid enters the reservoir. By reducing the pressure of the spring, more fluid is permitted to enter the reservoir for a particular force on the lower arm 35. When more fluid enters the reservoir, less fluid is immediately transferred toward the fluid rack and pinion 142. Therefore, the rack and pinion and actuator mechanisms experience less movement. Instead, the movement is taken up by the spring 175 in the reservoir 174 for greater shock absorption. This arrangement thus inhibits detrimentally high pressures and flow rates through a high pressure side comprising the first, second, and third fluid lines 173, 177, 182 connecting the actuation cylinder 143 and fluid driven rack and pinion 142. This, in turn, provides for less wear and tear on the mechanisms. It is to be understood that an air pressure of the spring 175 may be controlled by the vehicle speed. In any case, the above described safety and shock absorption features in the fluid actuation system enable the rider to lean smoothly remaining substantially in line with the wheels.

When the load is withdrawn and the lower arm 35 moves in a direction away from the frame as indicated by arrow 191 in FIG. 2B, the fluid 172 flows freely in the opposite direction through the control valve 178, fluid reservoir 174, and into the actuation cylinder 143. The fluid also flows out of a low pressure side of the actuation cylinder 143 and into a fourth fluid line 184 and into the a low pressure side of the fluid driven rack and pinion 142. An equilibrium pressure can be adjusted to urge the plunger 171 and the actuation drive shaft 167 into a non-deflected position when the position indicator cam 160 is rotated away from the actuation cylinder 143. As can be appreciated, the suspension arms are not regularly forced downward (in a direction opposite to arrow 190 in FIG. 4G) by impact forces from going over bumps. Furthermore, forces moving the suspension arms away from the frame 20, 23, 34 are much less than those forces moving the suspension arms toward the frame 20, 23, 34. Therefore, the safety features are only needed on the high pressure side or portion of the fluid system that sends fluid 172 to the fluid driven rack and pinion 142 as the lower arm is moved in a direction of the arrow 190 toward the frame 20, 23, 34 as shown in FIG. 4G.

It is contemplated that a solenoid valve can be provided in the fluid system to stop the fluid flow. Thus, the solenoid valve can be selectively activated to stop the flow and maintain the suspensions in their current position. This feature could be particularly advantageous, for example, when the vehicle is in a leaned state on the side of a hill. Thus, the solenoid valve could be activated to prevent inadvertent leaning down hill.

Figure 5:
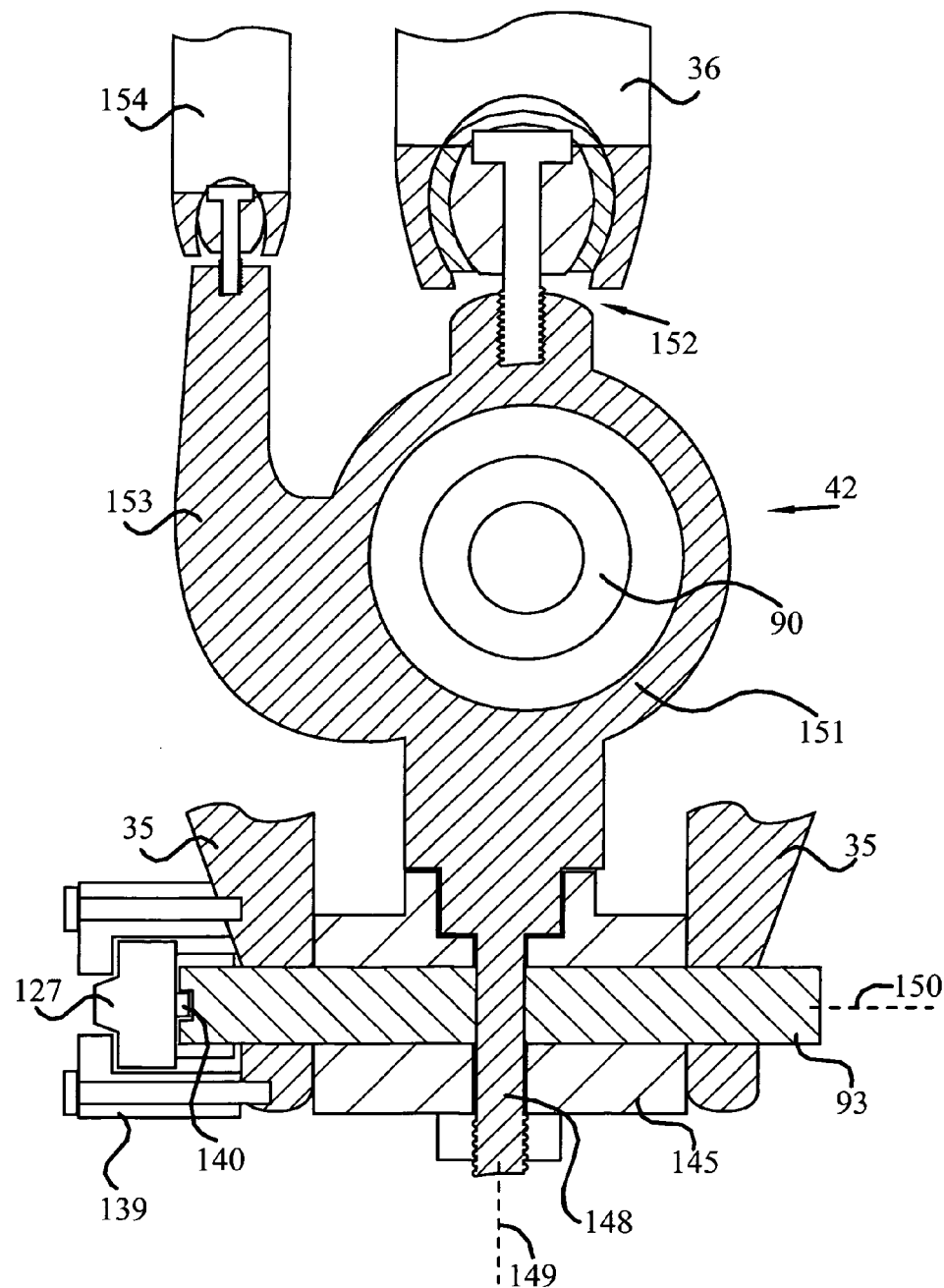
FIG. 5 is a sectional view of a hub assembly taken along lines 5—5 of FIG. 3A.

Further shown in the embodiment of FIG. 4A, a position sensor 127 in the form of a potentiometer is fixedly mounted in the housing 57 proximate to a first connection pin 130. As shown in FIG. 4E, which is a sectional view taken along lines 4E—4E of FIG. 4A, the first connection pin 130 has a gear 133 fixed thereon. The first connection pin 130 is press fitted or otherwise fixed to the actuator arms 54, (as may be appreciated from FIGS. 4A and 4E). Thus, as the actuator arms are rotated, the first connection gear 133 is rotated through an equivalent angle. The first connection gear registers with a potentiometer gear 136 so that the angle of rotation of the actuator arm 54 is sensed by the potentiometer of the position sensor 127. The potentiometer is held in place on the housing by a bracket 139. Loosening the bracket allows rotation of the potentiometer for proper calibration before tightening again. The potentiometer is an outboard position sensor since the angular movement between the actuator arm 54 and the housing correspond to the angular movement between the hub assembly 42 and the lower arm 35. Alternatively, the potentiometer could be fixedly mounted to the lower arm 35 in alignment with the hub pin 93 and an input shaft 140 of the potentiometer could be non-rotatively coupled to an end of the hub pin 93 as shown in FIG. 5. However, the outboard position sensor positioned thus could be more vulnerable to damage.

FIG. 5 is a sectional view of the hub assembly 42 taken along lines 5—5 of FIG. 3A. As shown, the hub pin 93 is press fit or otherwise fixed in the lower arm mount 145 of the hub assembly 42. The arm mount 145 and hub pin 93 have aligned through holes rotatively receiving a spindle pin 148 on a first axis 149. The arm mount 145 and hub pin 93 are rotatively connected to the outboard end of the lower arm 35 on a second axis 150. In the case of the outboard position sensor 127 being mounted in the actuator housing 57, the hub pin can be fixed to the lower arm 35 and rotatively received in the lower arm mount 145. In either case, the spindle housing 151 has two axes of rotational motion relative to the lower arm 35. A spherical bearing mount 152 rotatively connects an upper end of the hub assembly 42 to the upper control arm 36 so that it also has two axes of rotative motion relative to the upper control arm 36. Rotation of the spindle housing 151 about the second axis 150 is caused by movement of the upper control arm 36 relative to the lower arm 35 when actuated by the actuator 39. Rotation of the spindle housing about the first axis 149 is caused by a turning force applied to the armature 153. The turning force is applied by a tie rod end 154 connected to a hydraulic cylinder, which may be a conventional hydraulic cylinder. The armature 153 in this application has strengthening webs and/or other structure to withstand the strong turning loads that accompany large articulation angles about the two axes 149, 150. The loads can be especially large in racing and/or off-road applications.

Figure 6:
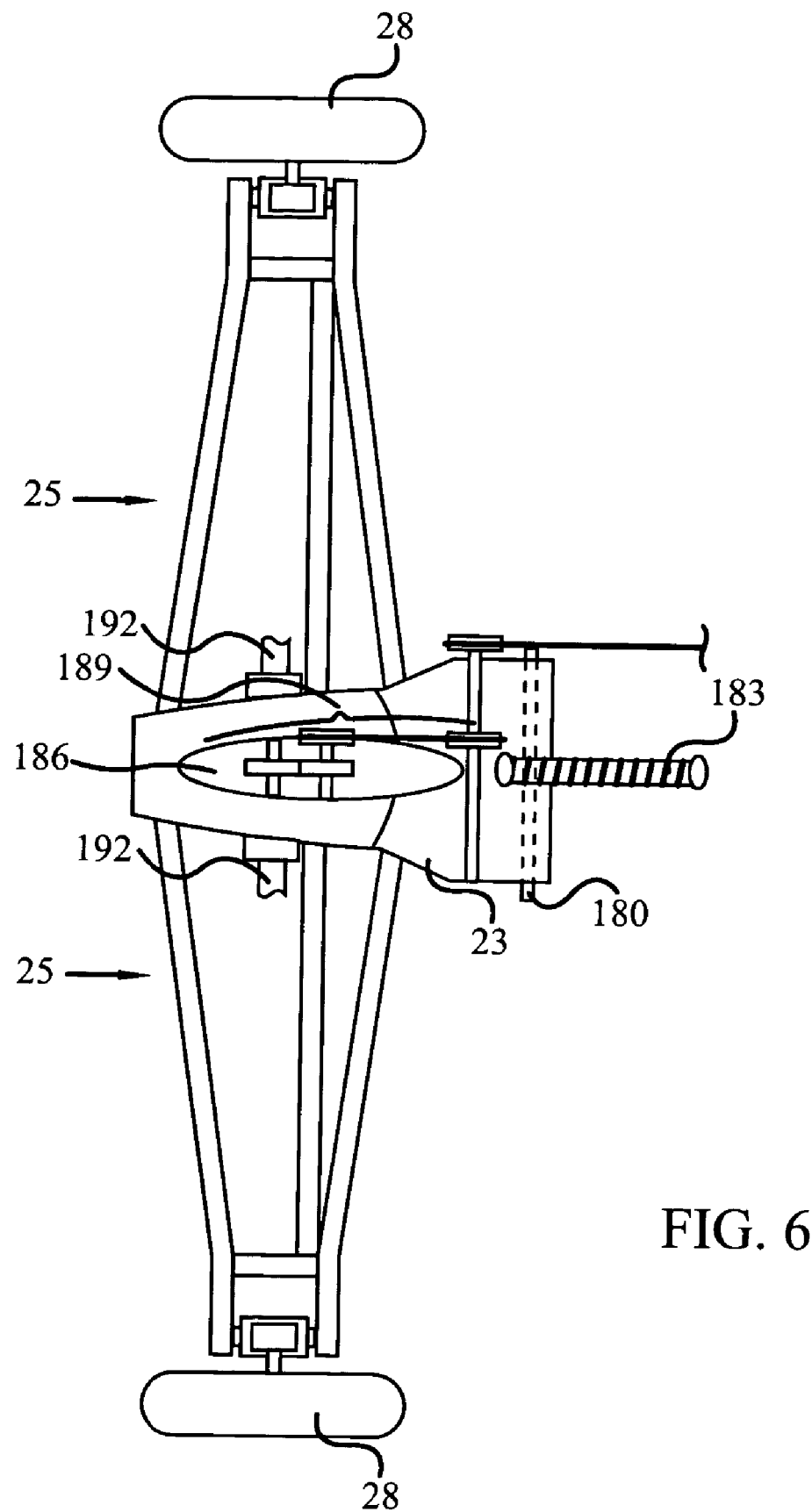
FIG. 6 is a top view of a frame and suspensions of the present invention, with the frame incorporated as a rear swing arm of a motorcycle.

FIG. 6 is a top view of the rear swing arm frame 23 that can be used in applications such as with the vehicle 10 of FIG. 1A. The rear swing arm frame 23 functions as a standard swing arm of a motorcycle and is mounted on a pivot pin 180. The swing arm frame 23 has a rear shock absorber 183 connected to the frame 23 and to the motorcycle analogous to standard rear shock absorbers in motorcycles. The swing arm frame 23 has a central opening 186 in which is disposed a differential 189. The differential is shown as a chain driven differential although a shaft driven differential is within the scope of the invention. The differential is connected to and drive half shafts 192 that are normally motively connected to the wheels, but which are shown cut away for illustrative purposes. The half shafts 192 may incorporate telescoping pieces and a plurality of universal or constant velocity joints to accommodate the great amount of articulation in the arm assemblies 25. The differential can be a positive traction differential incorporating unidirectional bearings, for example. Similarly, the front wheels could also be driving wheels driven by similar half shafts, and the front frame 20 could thus have an opening and incorporate a similar differential 189.

Figure 7:
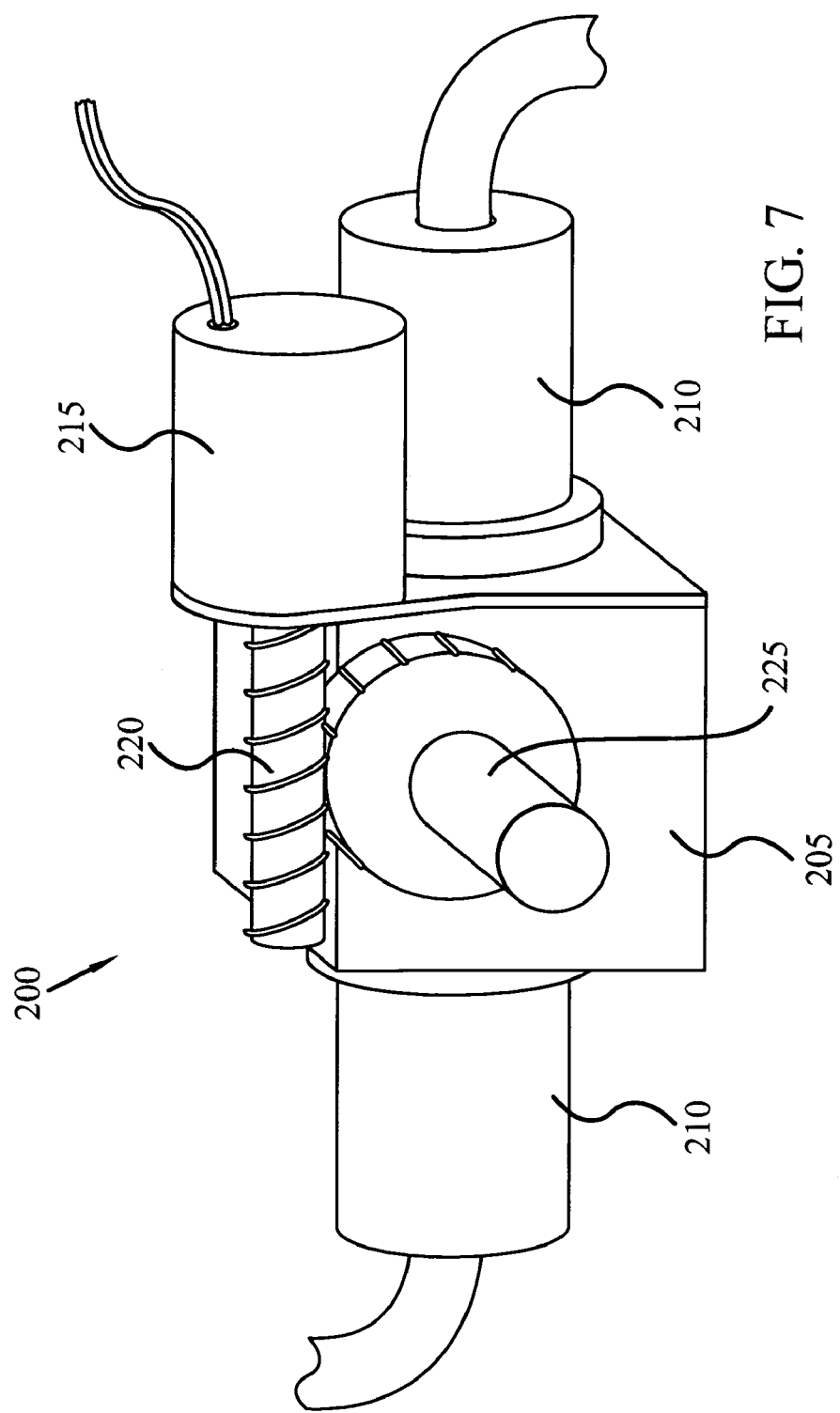
FIG. 7 is a perspective view of the rear steering mechanism according to the present invention.
Figure 8:
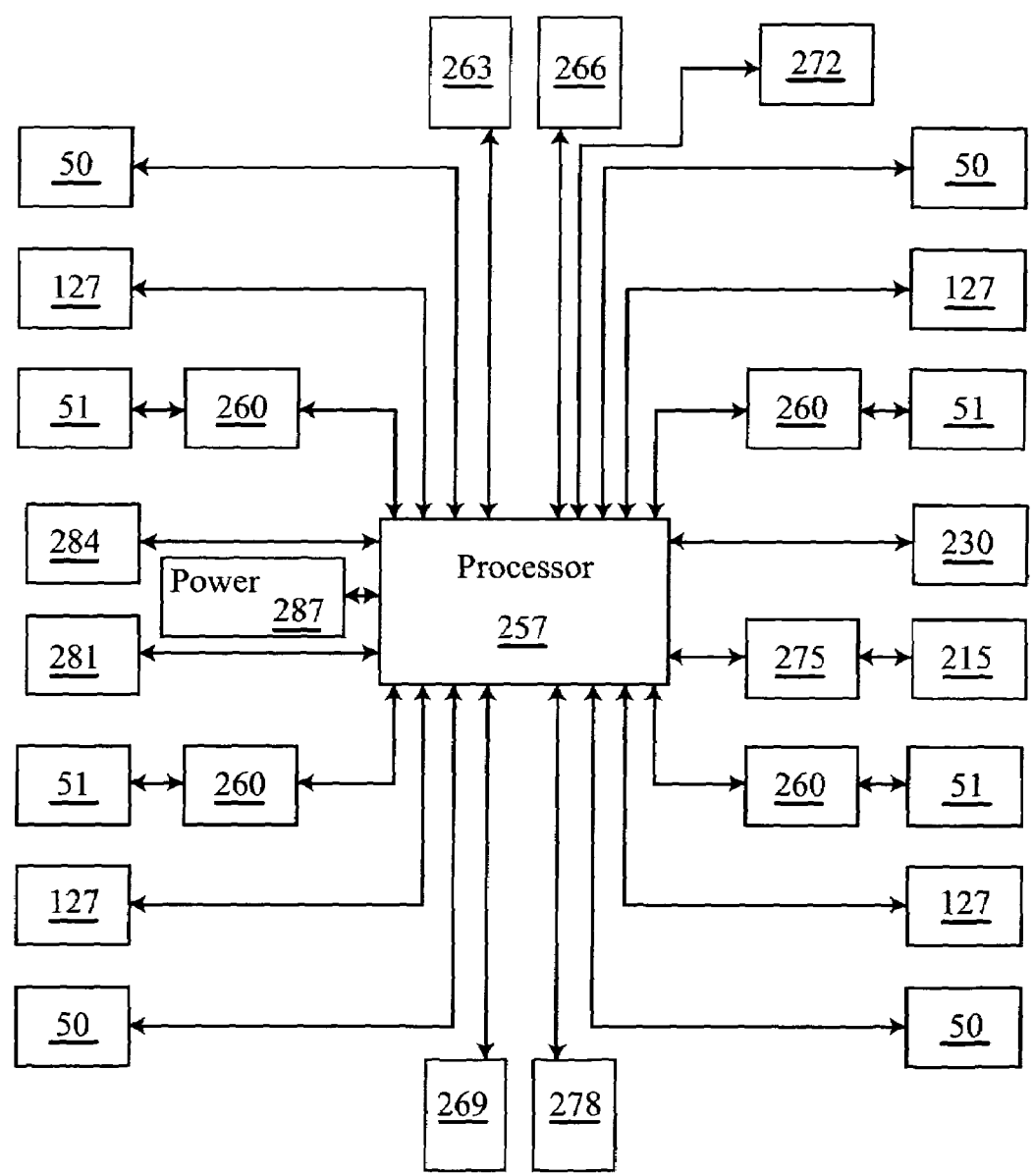
FIG. 8 is a block diagram depicting sensors, a actuator motors, speed controllers, and an ECU that may be used in accordance with any of the embodiments of the present invention.

FIG. 7 is a perspective view of a steering mechanism 200 that can be incorporated for controlling the rear steering in a vehicle of the present invention. The steering mechanism incorporates a rotary rack and pinion 205. The rack moves pistons in hydraulic cylinders 210. The pinion is actuated by a rear steering actuator motor 215 that can be integral with or added on to a rotary rack and pinion housing. The rear steering actuator motor 215 turns a worm gear 220 that actuates or engages an input shaft 225 of the rack and pinion 205. The input shaft 225, in turn, actuates the pinion of the rack and pinion 205. In this way, fluid is forced out of one of the cylinders 210 and moves a respective piston in cylinders that actuate tie rods. A rear steering position sensor, such as a potentiometer connected to the pinion shaft or a magnetic position sensor in one of the hydraulic cylinders (not shown in FIG. 7), can sense the position of the steering. The rear steering position sensor 230 is operably associated with the other electric components of the system as shown in FIG. 8. A similar steering mechanism can be implemented on a front steering of a vehicle of the present invention.

FIG. 8 is block diagram showing various electrical and electronic components that can be implemented to a greater or lesser degree depending on the degree of automation desired. In the fully automated configuration, the frame(s) 20, 23, 34 and arm assemblies 25 are operably connected to an electronic control unit (ECU) 257. The ECU can be mounted anywhere on the frame(s) 20, 23, 34. Alternatively, the ECU can be mounted on the vehicle associated with suspension system. The ECU is operatively associated with the other electrical components for receiving feedback and sending control signals. For example the actuator motors 51 are connected to the processor via speed controllers 260. In this case, the actuator motors 51 can be speed controllable servomotors. The motors 51 can thus be controlled by a predetermined protocol provided by circuitry or a program in the ECU. The protocol includes a set of logical steps and responses based on input from the various electrical components.

The ECU 257 is advantageously utilized to accomplish a first major function of automatically leaning the frame 20, 23, 34 and wheels 28 in accordance with a particular speed and turning angle of the vehicle 10. To this end, the vehicle 10 is provided with a speed sensor 263 operatively associated with the ECU. The speed sensor 263 can be a device that senses revolutions per minute at the front wheel or at a selected location in the drive train. Alternatively, the speed sensor 263 could be a sensor that detects ground speed. A front steering position sensor 266 is provided in the form of a magnetic sensor in the hydraulic rams or as a potentiometer on the shaft of a rotary rack and pinion steering system both of which are known. Signals from the speed sensor 263 and the front steering position sensor 266 are transmitted to the ECU. The ECU processes the signals and calculates a proper angle of lean. Then the ECU sends a signal to the motors 51 to actuate the arm assemblies 25 to provide the proper angle of lean. In this case, all of the arm assemblies 25 will tilt in a common plane relative to the frame(s) 20, 23, 34. All of the wheels 28 and the frame(s) 20, 23, 34 will be at the same angle relative to this common plane. The arm assemblies 25 can be stopped at the proper lean angle based on a particular metered number of rotations or pulses by the motor 51. Alternatively, the arm assemblies 25 can be stopped at the proper angle based on feedback from the outboard sensors 127. Further alternatively, the arm assemblies can be stopped at their proper angle based on a combination of metered input and feedback from sensors. Since the speed and angle of turn will generally vary continuously, the ECU 257 continuously receives signals, calculates an appropriate angle of lean, and actuates the motors via the speed controllers 260 in accordance with the predetermined protocol. Thus, the angle of lean is continuously adjusted.

Alternatively or additionally, one or more lean force sensors 269 are provided for sensing centrifugal and gravitational forces. The lean of the vehicle could be based exclusively on the feedback from a a single lean force sensor 269 mounted inside the ECU housing, for example. Alternatively, a plurality of force sensors could be located at different positions in the vehicle, frame, and suspension. Feedback from such force sensors could be used to automatically balance the forces generally evenly or otherwise based on the predetermined protocol. The lean force sensors 269 could be used in addition to the speed and turning position sensors for redundancy and for additional feedback. It is to be understood that the feedback from the lean force sensors should be averaged over a sufficient period of time so as to not be significantly affected by changes in the contour of the driving surface.

Automatic adjustment of the angle of lean can be stopped by actuating a lean override switch 272 that is operatively associated with the ECU 257. Actuating the override switch 272 permits the angle of lean to be adjusted by the driver to a greater lean than the predetermined protocol provides, for example. Furthermore, the override switch 272 provides a safety feature in dealing with a power slide or other situations that commonly occur in riding. For example, when the automatic lean is a function of the turn angle, front counter steering in order to instantaneously pull out of a power slide could cause automatic lean in a direction radially outward relative to a curve being navigated. Such an automatic lean, in this case, is undesirable and could easily result in flipping the vehicle due to a shift in the center of gravity radially outward relative to the curve that is being navigated. Thus, to prevent this, a driver can actuate the lean override switch before counter steering the front steering during a power slide. The override switch can take any of a variety of forms including, but not limited to, a rotatable left grip or a finger or thumb actuated lever. When lean is based on feedback from lean force sensors 269, the need for a lean override may be eliminated since the system will attempt to balance the forces independent of front counter steering. However, the lean override feature may be included in a system with lean force sensors for additional control.

The lean override switch 272 can be configured with a single "off" and a single "on" position for allowing a driver to simply take over control of lean by shifting his or her own weight when the override switch is in the "on" position. Alternatively, the override switch 272 can be implemented with plural discrete "on" settings or as a rheostat switch for continuous adjustment over a range of motion in the switch 272. It is to be understood that the lean override switch 272 can be configured to stop the movement of the actuator to hold the lean of the vehicle at any attitude. In the case of an override switch 272 having more than one on position, the switch 272 could be configured to provide manual actuation of the actuator motors 51 via the override switch 272 in order to lean the frame(s) 20, 23, 34 and vehicle 10 as desired.

The ECU 257 is used to accomplish a second major function of absorbing shock by actually tracking a contour of the surface 30. To this end, signals from the inboard and outboard sensors 50, 127 are fed back to the ECU 257 and are there compared. If the inboard position sensor 50 registers a greater deflection angle than the outboard position sensor 127, then the ECU actuates the motor 51 to make the outboard angle equivalent to the inboard angle in accordance with the predetermined protocol. This occurs, for example, when one of the arm assemblies 25 is independently raised by a bump. In this case, compression of the shock absorber 48 is initiated. However, as soon as this deflection of the arm assembly 25 begins, the difference between the inboard angle and the outboard angle is detected and the arm assembly is actuated to the position that accommodates the bump. Because the feedback and actuation occurs very fast, the arm assembly is able to track up and over the bump with minimal compression of the shock absorber 48. Furthermore, a reduced amount of the load from the bump is transferred to the other side of the vehicle because the pertinent arm assembly has responsively moved up and over the bump. Once the bump has been passed, the arm assembly 25 immediately returns to the appropriate angle for a proper lean based on the current speed, and angle of turn or alternatively, based on the speed and angle of turn when the bump was first encountered. This shock absorption is provided by each of the arm assemblies 25 independently of each other. In this way, the frame and suspension system accomplishes both automatically leaning the frame(s) 20, 23, 34 and providing shock absorption by automatically tracking the contour of the surface 30 simultaneously.

It is to be understood that the outboard position sensors 127 could be eliminated altogether. The angle of the wheels 28 could be adjusted to coincide with an angle detected by the inboard sensor 50 when the arm assemblies 25 are moved to absorb a shock or to accommodate a bump in the contour of the driving surface 30.

It should be noted that this shock absorption by tracking is made possible in part by the speed capabilities of the motors 51. The motors 51 can be provided as servomotors that have an operating range of speeds from zero to approximately fifteen thousand revolutions per minute. At ten thousand revolutions per minute, twenty revolutions will only take a fraction of a second. With the present invention, it is also possible to move the arm assembly 25 through an angle of twenty-two and a half degrees in only a fraction of a second. It is to be understood that the speed of the actuator will vary based on the speed at which a bump is encountered, for example. In this way, the actuator motor speed will be automatically controlled to properly mirror the contour of the driving surface 30. The rate of the motors 51 will be adjusted so that they do not jar or shake the suspension and driver badly at their adjusted rate. In one configuration, the actuator motor speed can be adjusted to mirror the spring mechanism. Alternatively, the actuator can be moved slightly slower than the spring compression rate of the shock absorbers 48 to allow movement of the suspension and accompanying feedback on which to base continuing adjustment. Furthermore, the rate may be varied over the course of a single actuation to "ease" the abruptness of stopping and starting a particular shock absorbing motion.

It should be further noted that the shock absorbers are needed to provide "feed forward" or to permit the initial difference between the outboard angle and the inboard angle. Another way to express what occurs during the tracking type of shock absorption is that the angle between the hub assembly 42 and the lower arm 35 reflects the proper angle of lean to accommodate a specific angle of turn at a specific speed in accordance with the predetermined protocol. When the angle between the lower arm and the frame(s) 20, 23, 34 becomes greater than or less than the outboard angle, then the actuators move the actuator arm 54 and the associated parallelogram structure including the hub assembly 42 and the upper control arm 36 to match the inboard angle. Because of the parallelogram aspect of the arm assembly structure, the hub assembly 42 is automatically placed at the same angle as the inboard angle relative to the lower arm 35. As can be appreciated, the shock absorbers 48 are also important once the arm assembly 25 has reached an extreme in its range of motion. For example, when further relative motion between the lower arm 35, upper control arm 36, and actuation arm 54 is physically limited, the shock absorber 48 can provide the needed deflection and shock absorption.

It should be further noted that the position of the shock absorbers 48 can be changed without departing from the spirit and scope of the invention. For example, instead of the configuration shown in FIGS. 2A and 2B, the upper control arm 36 can be configured to connect to the pair of actuator arms 54 at a location between the actuator arms 54 instead of at a pair of opposite outside positions. With this configuration, a pair of shock absorbers 48 can be placed on opposite outside positions instead of between the pair of actuator arms as shown in FIG. 2A. This double shock absorber arrangement would be of particular benefit with heavier vehicles may have larger and heavier frames. Another alternative arrangement for the shock absorbers is to provide the shock absorbers inside the frame.

Still further it should be noted that a vehicle incorporating the mechanisms of the present invention may further include an automatically adjustable shock absorber system to compensate for off balance loads within the vehicle. For example, if the vehicle is loaded more on the left than on the right, the system would adjust by increasing the gas pressure in the shock absorbers on the left of the vehicle.

The above described tracking functions can further alternatively be provided by a more sophisticated forward looking system for mapping a contour of the driving surface. Thus, the predetermined protocol could be configured to provide a pre-absorption of the shock of a bump, for example, by raising the wheels 28 just before they reach the bump.

It should be further noted that the frame and suspension system of the present invention is intended, at least in some cases, to provide a suspension on a suspension. This is the case, for example, for a motorcycle body supported on frames 20, 23. In this case, conventional motorcycle shock absorbers are retained on the steering forks and on the rear swing arm frame 23. Thus, the motorcycle and driver 5 benefit from a non-conventional suspension on top of a suspension for and even smoother ride.

Rear steering can be implemented with any of the embodiments of the present invention. Rear steering capability is particularly beneficial in racing and other special applications. To this end, a rear steering position sensor can be operatively associated with the ECU. The rear steering actuator motor 215 is also operatively associated with and controlled by the ECU in accordance with the predetermined protocol. As with the other actuators set forth above, the rear steering actuator can be connected to the ECU by a speed controller 275. In this way, the speed of the rear steering motor and the position of the rear steering angle can be controlled automatically. The predetermined protocol can be configured to operate the rear steering mechanism by running the rear steering actuation motor 215 a set numbers of rotations or pulses, moving the rear steering actuator in accordance with feedback from the rear steering position sensor 230, or a combination of both. It is to be understood that the angle of turn for the rear steering can be in the same direction as the front steering and at a percentage of the front steering position. Although most applications call for the rear wheels to be turned only a small percentage of the front turn angle, it is possible to provide the rear turn angle at as much as one hundred percent of the front steering turn angle.

It is to be understood that the front steering position sensor 266 could be provided as a gyroscopic sensor or sensors that sense a change in the angle of lean of the vehicle by use of a gyroscope. In fact, an additional sensor or sensors could be provided in combination with the front steering sensor 266, or as a separate gyroscope for detecting attitude changes. Providing an attitude sensor in this way has the advantage of providing the system with a reference point. This could be particularly important when the driving surface is extremely steep, and especially when the slope is in a side-to-side direction. In this case, the attitude sensor could actually provide feedback to enable the processor to maintain the frame and vehicle in an upright position when traveling in a straight line on a side-to-side inclined surface. This upright position could function as a reference orientation. Gyroscopes and sensors for this purpose can be mounted anywhere on the vehicle or frame 20, 23, 34. The gyroscopes may be of the silicon type and be packaged with the ECU.

It is to be further understood that force sensors 281, 284 could be included in the front steering mechanism and operatively associated with the ECU 257. The protocol controls an actuator in the hydraulic steering to decrease a flow of hydraulic fluid with increasing speed to provide a proper feel to the driver. As the required force increases due to restricted fluid flow, the force sensors detect the increased forces applied by the driver. Feedback from the force sensors 281, 284 is thus provided to the ECU, which in turn can effectuate an alternative or additional lean of the wheels 28. This aspect of the invention is considered to be particularly beneficial in applications in which the vehicle is a car.

In all applications the actuators, ECU, and other electrical components require a power source 287. It is contemplated that this power source could include a variety of batteries and capacitors to take advantage of the particular characteristics of each battery type and the capacitor. For example, in applications in which the vehicle is a human powered vehicle, such as a bicycle, the power source could include nickel zinc batteries, lead acid batteries, and a capacitor in line with the batteries. The power source could be rechargeable, including recharging by regeneration.

Another convenient and useful aspect of the invention is the counter steering feature in which the rear steering is automatically turned in an opposite direction from the front steering. This enables a driver to make very tight turns and is typically utilized at low speeds. In the present invention, rear counter steering is actuated by pressing a momentary switch 278 that is operatively associated with the ECU. That is, the switch must be held in an "on" position for as long as the rear counter steering feature is being implemented. When the momentary switch is held in the "on" position, the ECU automatically sends signals to the rear steering actuator 215 via the rear steering speed controller 275 to steer the rear wheels in an opposite direction relative to the front wheels in accordance with the predetermined protocol. Once again, the angle of turn of the rear counter steering is a percentage of the front steering angle, and can be selected between zero and one hundred percent. When the switch is released, the feature is automatically turned off and the rear steering automatically reverts to that provided by the predetermined protocol without the momentary switch being actuated.

It is to be understood that the automatic rear steering and counter steering can be provided as a function of the speed in the protocol. The exception is when the override switch is actuated, in which case the rear steering becomes a function of the lean.

It is to be further understood that the predetermined protocol can be adjusted or can include settings that can be selected. For example, it is possible to adjust the protocol or select a setting that turns "off" automatic rear steering. Furthermore, the protocol can be configured to provide the function of absorbing shock by automatically tracking a contour as discussed above, but to not provide the automatic lean adjustment. Automatic lean adjustment is particularly beneficial in application having a low center of gravity because it is more difficult for a driver to effect lean by shifting his or her body weight. However, the automatic lean feature can be incorporated in applications having high centers of gravity, such as with motorcycle having upright seating configurations. Advantageously, the present invention can be implemented with vehicles having any of a variety of occupant supporting configurations including, but not limited to, recumbent, prone, and kneeling.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A vehicle with a lean and alignment control system, comprising:
   a frame having a central longitudinal axis and an upright axis that is adapted to be generally perpendicular to a surface on which the vehicle rests when the frame is in a neutral position with no net leaning loads applied;
   a suspension comprising a plurality of arm assemblies connected to the frame;
   a mechanical feedback mechanism forming an interconnection between the frame and the suspension;
   wherein each arm assembly comprises:
      a lower arm having an inboard end and an outboard end;
      an upper control arm having an inboard end and an outboard end; and
      an actuator mounted to the lower arm and motively connected to the upper control arm.

2. The vehicle of claim 1, wherein the actuator further comprises:
   an actuator arm pivotally connected to the inboard end of the upper control arm; and
   a mechanical drive mechanism motively connected to the actuator arm to move the actuator arm through a range of motion.

3. The vehicle of claim 2, wherein the mechanical feedback mechanism comprises a position indicating cam operably associated with the arm assembly for automatically controlling the mechanical drive mechanism and the actuator arm.

4. The vehicle of claim 3, wherein:
   the position indicating cam comprises an eccentric fixed to rotate with the lower arm; and
   the mechanical drive mechanism comprises an actuation cylinder mounted to the frame and receiving an input from the eccentric as the lower arm moves.

5. The vehicle of claim 4, wherein the mechanical drive mechanism further comprises:
   the actuation cylinder in fluid communication with a fluid driven rack and pinion; and
   a fluid driven rack and pinion drivingly connected to the actuator.

6. The vehicle of claim 5, wherein the mechanical drive mechanism further comprises:
   the actuation cylinder fluidly connected to the fluid driven rack and pinion by a first fluid line containing a substantially noncompressible fluid; and
   a fluid reservoir in the first fluid line for receiving excess fluid during periods of excessive flow rate.

7. The vehicle of claim 6, wherein the reservoir is an expansible reservoir having an adjustable spring for adjusting an expansibility of the reservoir.

8. The vehicle of claim 5, wherein the mechanical drive mechanism further comprises:
   the actuation cylinder fluidly connected to the fluid driven rack and pinion by a first fluid line containing a substantially noncompressible fluid; and
   a pressure control valve in the first fluid line for adjusting a flow aperture through which the fluid flows.

9. The vehicle of claim 8, wherein the pressure control valve comprises a needle valve for adjusting the flow aperture and a pop off valve for releasing the fluid at pressures greater than a predetermined threshold.

10. The vehicle of claim 5, wherein the mechanical drive mechanism further comprises:
    the actuation cylinder fluidly connected to a first side of the fluid driven rack and pinion by a first fluid line;
    the actuation cylinder fluidly connected to a second side of the fluid driven rack and pinion by a second fluid line.

11. The vehicle of claim 2, wherein:
    the arm assembly is a first arm assembly, the vehicle further comprising a plurality of arm assemblies including the first arm assembly;
    the mechanical feedback mechanism is a first mechanical feedback mechanism, the vehicle further comprising a plurality of feedback mechanisms including the first feedback mechanism, the plurality of feedback mechanisms operatively associated with respective arm assemblies; and
    each mechanical feedback mechanism comprises a position indicating cam operably associated with the respective arm assemblies for automatically controlling the mechanical drive mechanism and the actuator arm in each arm assembly.

12. The vehicle of claim 11, wherein the plurality of arm assemblies comprises:
    at least a first arm assembly on a first side of the frame;
    at least a second arm assembly on a second side opposite to the first side; and
    wherein the mechanical feedback mechanisms automatically move the first arm assembly through a first lean angle closer to the frame and the second arm assembly away from the frame so that the first and second arm assemblies remain generally parallel to each other in response to a leaning force applied by a rider of the vehicle.

13. The vehicle of claim 11, further comprising:
    at least one speed sensor operably associated with the vehicle and adapted for detecting the vehicle speed;
    a mechanism for automatically adjusting an expansibility in a fluid reservoir based on the vehicle speed; and
    wherein the mechanical feedback mechanisms control the fluid driven rack and pinions in each arm assembly and move the actuator arms to provide a smooth lean of the frame relative to the arm assemblies.

14. The vehicle of claim 2, further comprising:
    a shock absorber having an inboard end and an outboard end;
    the inboard end of the shock absorber connected to the frame; and
    the outboard end of the shock absorber connected to the actuator arm.

15. The vehicle of claim 14, wherein the shock absorber is connected to the actuator arm outboard relative to a position at which the upper control arm is connected to the actuator arm.

16. The vehicle of claim 14, wherein the shock absorber moves in a range of motion between:
   a first position in which the shock absorber extends in an end to end direction substantially parallel with the lower arm of a first arm assembly of the plurality of arm assemblies when the frame is leaned away from the first arm assembly; and
   a second position having an angle of approximately forty-five degrees relative to the lower arm of the first arm assembly when the frame is leaned toward the first arm assembly.

17. The suspension of claim 14, wherein the outboard end of the shock absorber moves in a range of motion between a position generally above the upper control arm to a position generally below the upper control arm.

18. The vehicle of claim 2, wherein the actuator arm comprises:
   a first connection comprising structure that connects the actuator arm to the lower arm;
   a second connection comprising structure that pivotally connects the actuator arm to the upper control arm;
   a third connection that connects a shock absorber to the actuator arm; and
   wherein a line through the first connection and the second connection is at an angle in a range substantially from 0 to 90 degrees relative to a line through the first connection and the third connection.

19. The vehicle of claim 18, wherein the angle is approximately forty-five degrees.

20. The vehicle of claim 18, wherein the third connection is outboard of the second connection.

21. In a vehicle, a method of tracking a contour of a driving surface to absorb shock, the method comprising:
   automatically and independently raising and lowering a plurality of arms of the vehicle suspension to accommodate variations in the contour by a mechanical mechanism;
   providing feedback via the mechanical mechanism to an actuator; and
   raising and lowering the arms by the actuator according to the feedback;
   wherein the mechanical mechanism comprises a position indicating cam fixedly supported relative to at least one of the arms, and wherein the step of providing feedback further comprises feeding back a representation of a position of the at least one of the arms by way of the cam.

* * * * *